United States Patent
Mashitani et al.

(10) Patent No.: US 9,354,494 B2
(45) Date of Patent: May 31, 2016

(54) PROJECTION TYPE IMAGE DISPLAY APPARATUS AND ADJUSTING METHOD

(71) Applicant: Panasonic Intellectual Property Management Co., Ltd., Osaka-shi, Osaka (JP)

(72) Inventors: Ken Mashitani, Osaka (JP); Kazuma Tani, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/597,890

(22) Filed: Jan. 15, 2015

(65) Prior Publication Data

US 2015/0219983 A1     Aug. 6, 2015

(30) Foreign Application Priority Data

Feb. 4, 2014    (JP) ................................. 2014-019045
Dec. 1, 2014    (JP) ................................. 2014-242807

(51) Int. Cl.
| | |
|---|---|
| *H04N 9/31* | (2006.01) |
| *G03B 21/14* | (2006.01) |
| *G02B 26/08* | (2006.01) |
| *G09G 3/00* | (2006.01) |
| *G09G 5/399* | (2006.01) |

(52) U.S. Cl.
CPC ............ *G03B 21/142* (2013.01); *H04N 9/3188* (2013.01); *G02B 26/08* (2013.01); *G02B 26/0875* (2013.01); *G02B 26/0883* (2013.01); *G02B 26/0891* (2013.01); *G09G 3/003* (2013.01); *G09G 3/005* (2013.01); *G09G 5/399* (2013.01); *G09G 2340/0407* (2013.01)

(58) Field of Classification Search
CPC ............... H04N 9/3188; G03B 21/142; G09G 2340/0407; G09G 3/003; G09G 3/005; G09G 5/399; G02B 26/08; G02B 26/0875; G02B 26/0883; G02B 26/0891
See application file for complete search history.

(56) References Cited

U.S. PATENT DOCUMENTS

| | | | | |
|---|---|---|---|---|
| 5,402,184 A | * | 3/1995 | O'Grady | .............. H04N 5/7458 348/764 |
| 5,583,694 A | * | 12/1996 | Takahashi | ................ G02B 1/06 359/557 |
| 5,626,411 A | * | 5/1997 | Takahashi | ................ G02B 1/06 348/E17.005 |

(Continued)

FOREIGN PATENT DOCUMENTS

| | | |
|---|---|---|
| JP | 6-123868 | 5/1994 |
| JP | 2004-205917 | 7/2004 |
| JP | 2005-227334 | 8/2005 |

*Primary Examiner* — Bao-Luan Le
(74) *Attorney, Agent, or Firm* — Hamre, Schumann, Mueller & Larson, P.C.

(57) ABSTRACT

A projection type image display apparatus includes an adjusting sub-frame image generator and a shift amount adjuster. The adjusting sub-frame image generator generates a primary adjusting sub-frame image having a design in which a first line having a first color and a width of an N pixel (N being a natural number) is displayed on a background image having a second color, and a secondary adjusting sub-frame image having a design in which a second line having a third color and a width of an M pixel set to N=M+α (M being an integer equal to or greater than 1, α being an integer equal to or greater than 0) is displayed on a background image having a fourth color. The shift amount adjuster adjusts the shift amount when the display positions of the primary and secondary adjusting sub-frame images on the projection surface are shifted relatively to each other.

13 Claims, 20 Drawing Sheets

(56) References Cited

U.S. PATENT DOCUMENTS

| | | | | |
|---|---|---|---|---|
| 5,784,038 A * | 7/1998 | Irwin | H04N 9/3114 345/32 |
| 6,407,726 B1 * | 6/2002 | Endo | G09G 3/001 345/32 |
| 6,717,636 B2 * | 4/2004 | Shimada | G02B 27/283 348/E9.027 |
| 6,927,890 B2 * | 8/2005 | Allen | G09G 3/002 348/E9.027 |
| 6,963,319 B2 * | 11/2005 | Pate | G09G 3/001 345/204 |
| 6,984,040 B2 * | 1/2006 | Childers | G09G 3/007 348/743 |
| 7,021,766 B2 * | 4/2006 | Uehara | G02B 27/1046 349/5 |
| 7,030,894 B2 * | 4/2006 | Allen | G09G 3/002 345/698 |
| 7,034,811 B2 * | 4/2006 | Allen | G09G 3/002 345/204 |
| 7,052,142 B2 * | 5/2006 | Gupta | G03B 21/20 348/E5.137 |
| 7,086,736 B2 * | 8/2006 | Collins | G09G 3/007 348/743 |
| 7,098,936 B2 * | 8/2006 | Cole | G09G 3/007 348/698 |
| 7,109,981 B2 * | 9/2006 | Damera-Venkata | G06T 5/50 345/204 |
| 7,182,463 B2 * | 2/2007 | Conner | H04N 9/3188 348/E9.027 |
| 7,190,380 B2 * | 3/2007 | Damera-Venkata | G09G 3/007 345/204 |
| 7,253,811 B2 * | 8/2007 | Tretter | G09G 3/007 345/204 |
| 7,267,442 B2 * | 9/2007 | Childers | H04N 9/3117 348/792 |
| 7,270,416 B2 * | 9/2007 | Yamanaka | G02B 27/283 348/E9.027 |
| 7,270,417 B2 * | 9/2007 | Choi | G02B 26/0875 348/745 |
| 7,289,114 B2 * | 10/2007 | Damera-Venkata | G09G 3/007 345/100 |
| 7,300,157 B2 * | 11/2007 | Conner | H04N 9/3188 348/E9.027 |
| 7,301,549 B2 * | 11/2007 | Damera-Venkata | G09G 5/391 345/698 |
| 7,355,612 B2 * | 4/2008 | Damera-Venkata | G09G 3/007 345/589 |
| 7,387,392 B2 * | 6/2008 | Widdowson | G03B 21/14 345/9 |
| 7,407,295 B2 * | 8/2008 | Damera-Venkata | G03B 21/14 348/798 |
| 7,425,074 B2 * | 9/2008 | Kang | H04N 9/3188 353/121 |
| 7,443,364 B2 * | 10/2008 | Damera-Venkata | G09G 3/007 345/30 |
| 7,453,449 B2 * | 11/2008 | Ulichney | G09G 3/007 345/204 |
| 7,453,478 B2 * | 11/2008 | Martin | G09G 3/20 345/108 |
| 7,463,272 B2 * | 12/2008 | Damera-Venkata | G06T 3/4069 345/694 |
| 7,466,291 B2 * | 12/2008 | Damera-Venkata | H04N 9/3147 345/30 |
| 7,470,032 B2 * | 12/2008 | Damera-Venkata | H04N 9/3147 345/1.3 |
| 7,474,319 B2 * | 1/2009 | Allen | G09G 3/007 345/694 |
| 7,477,799 B2 * | 1/2009 | Chang | H04N 5/7458 348/E5.142 |
| 7,483,044 B2 * | 1/2009 | Damera-Venkata | G06T 3/4069 345/694 |
| 7,522,177 B2 * | 4/2009 | Damera-Venkata | G09G 3/007 345/691 |
| 7,524,068 B2 * | 4/2009 | Hayashi | G02B 17/0663 353/46 |
| 7,557,819 B2 * | 7/2009 | Cole | G09G 3/007 345/698 |
| 7,600,874 B2 * | 10/2009 | Childers | H04N 9/3117 348/742 |
| 7,657,118 B2 * | 2/2010 | Aufranc | G09G 5/02 345/204 |
| 7,660,485 B2 * | 2/2010 | Collins | G06T 5/50 345/204 |
| 7,668,398 B2 * | 2/2010 | Collins | G06T 3/40 345/204 |
| 7,675,510 B2 * | 3/2010 | Allen | G09G 3/002 345/204 |
| 7,676,113 B2 * | 3/2010 | Damera-Venkata | G06T 5/50 345/204 |
| 7,679,613 B2 * | 3/2010 | Allen | G09G 3/002 345/204 |
| 7,810,932 B2 * | 10/2010 | Hong | H04N 5/74 353/121 |
| 7,918,560 B2 * | 4/2011 | Miyazawa | G03B 33/12 353/20 |
| 7,986,356 B2 * | 7/2011 | Chang | H04N 9/3147 348/187 |
| 8,162,485 B2 * | 4/2012 | Takaura | H04N 9/3141 345/50 |
| 8,177,371 B2 * | 5/2012 | Nagai | G03B 21/14 353/121 |
| 8,353,599 B2 * | 1/2013 | Miyazawa | G03B 21/00 353/122 |
| 8,356,905 B2 * | 1/2013 | Cossairt | H04N 3/10 353/30 |
| 8,872,869 B2 * | 10/2014 | Damera-Venkata | G09G 3/007 345/629 |
| 8,994,764 B2 * | 3/2015 | Watanabe | G09G 3/003 345/690 |
| 9,041,868 B2 * | 5/2015 | Hirata | G03B 21/006 349/8 |
| 9,097,907 B2 * | 8/2015 | Endo | G02F 1/1335 |
| 9,250,507 B2 * | 2/2016 | Narimatsu | G03B 21/2053 |
| 2003/0020809 A1 * | 1/2003 | Gibbon | G03B 33/06 348/51 |
| 2004/0207815 A1 * | 10/2004 | Allen | G09G 3/007 353/31 |
| 2005/0134805 A1 * | 6/2005 | Conner | H04N 9/3188 353/46 |
| 2005/0140934 A1 * | 6/2005 | Seo | G03B 21/00 353/46 |
| 2005/0157272 A1 * | 7/2005 | Childers | G09G 3/007 353/84 |
| 2005/0162617 A1 * | 7/2005 | Koo | H04N 9/3188 353/46 |
| 2005/0185139 A1 * | 8/2005 | Yamanaka | G02B 27/283 353/20 |
| 2006/0007057 A1 * | 1/2006 | Choi | H04N 9/3179 345/9 |
| 2006/0082560 A1 * | 4/2006 | Greer | H04N 9/3108 345/204 |
| 2006/0140511 A1 * | 6/2006 | Chang | H04N 5/7458 382/298 |
| 2007/0097334 A1 * | 5/2007 | Damera-Venkata | H04N 9/3147 353/94 |
| 2008/0024518 A1 * | 1/2008 | Hoffman | G09G 3/007 345/611 |
| 2008/0158513 A1 * | 7/2008 | Bartlett | G03B 21/26 353/30 |
| 2008/0304016 A1 * | 12/2008 | Miyazawa | G03B 33/12 353/20 |
| 2009/0147031 A1 * | 6/2009 | Miyazawa | G03B 21/00 345/690 |
| 2010/0201952 A1 * | 8/2010 | Sakai | G03B 21/142 353/20 |
| 2010/0253921 A1 * | 10/2010 | Nagai | G03B 21/14 353/31 |
| 2011/0090465 A1 * | 4/2011 | Watanabe | G03B 21/28 353/31 |
| 2011/0234650 A1 * | 9/2011 | Watanabe | G09G 3/003 345/690 |
| 2014/0049698 A1 * | 2/2014 | Hirata | G03B 21/006 349/9 |

* cited by examiner

FIG. 8

| | 0 | 1 | 2 | 3 | 4 | 5 |
|---|---|---|---|---|---|---|
| 0 | 100 | 200 | 110 | 210 | 120 | 220 |
| 1 | 400 | 300 | 410 | 310 | 420 | 320 |
| 2 | 101 | 201 | 111 | 211 | 121 | 221 |
| 3 | 401 | 301 | 411 | 311 | 421 | 321 |

3840 (Column number)
2160 (Row number)

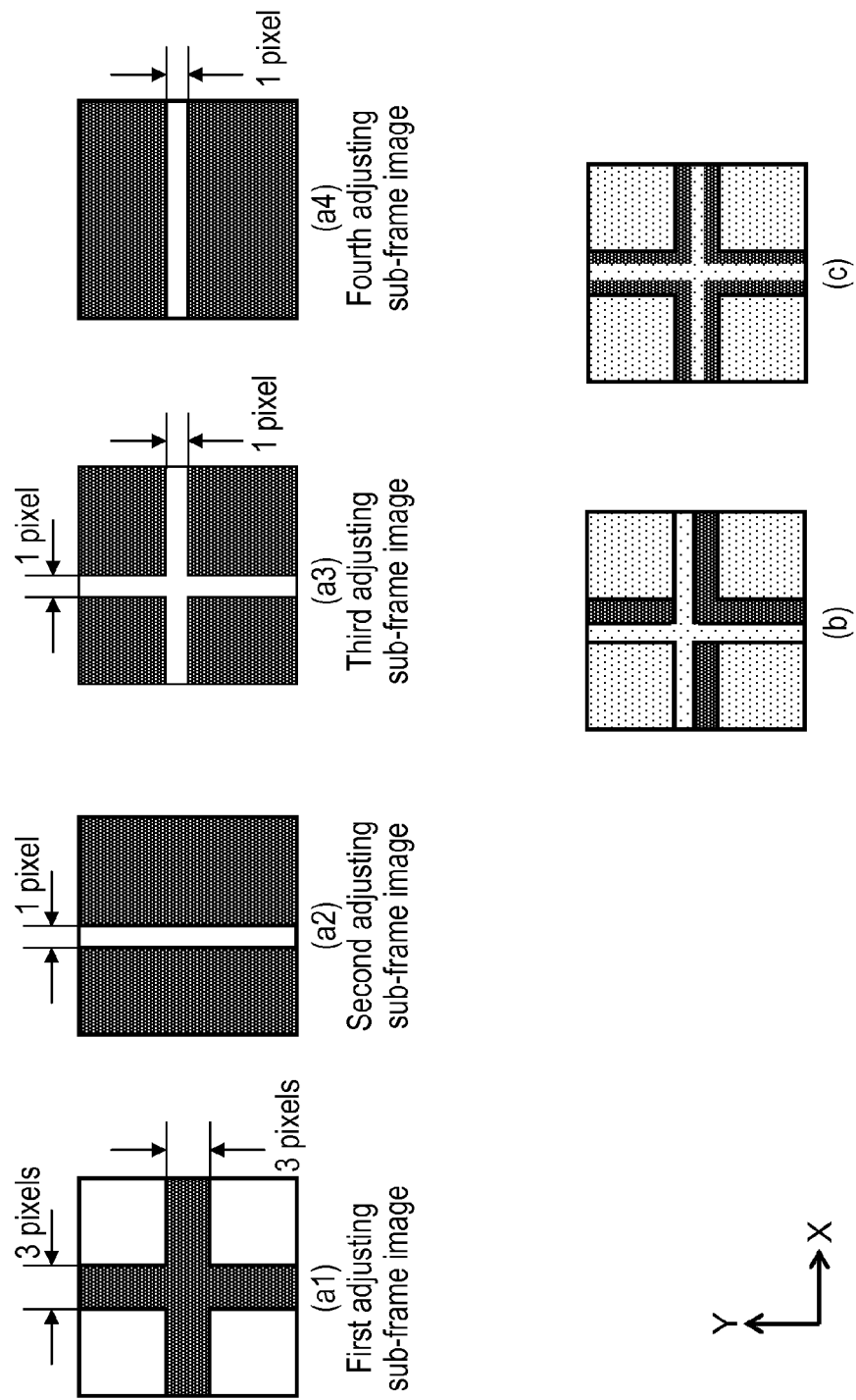

PROJECTION TYPE IMAGE DISPLAY APPARATUS AND ADJUSTING METHOD

BACKGROUND OF THE INVENTION

1. Field of the Invention

The present disclosure relates to a projection type image display apparatus such as a projector.

2. Background Art

Unexamined Japanese Patent Publication No. 2005-227334 (Patent Literature 1) discloses a projection type image display apparatus. This projection type image display apparatus includes an optical path shifter and a driver for moving the optical path shifter between a front lens group and a rear lens group. The optical path shifter changes the optical path of image light to the direction perpendicular to the optical axis.

This configuration allows this projection type image display apparatus to provide an image having a resolution higher than that of the image displayed with a light valve.

SUMMARY OF THE INVENTION

The present disclosure is directed to provide a projection type image display apparatus that allows easy adjustment of the amount of shift when image light is optically shifted.

A projection type image display apparatus of the present disclosure is configured to display an image formed of an image frame on a projection surface by projecting a plurality of sub-frame images forming the image frame onto the projection surface. The projection type image display apparatus is also configured to be capable of optically shifting projection positions of the sub-frame images when the sub-frame images are projected onto the projection surface. Further, the projection type image display apparatus includes an adjusting sub-frame image generator and a shift amount adjuster. The adjusting sub-frame image generator is configured to generate a primary adjusting sub-frame image and a secondary adjusting sub-frame image. The primary adjusting sub-frame image has a design in which a first line having a first color and a width of an N pixel (N being a natural number) is displayed on a background image having a second color. The secondary adjusting sub-frame image has a design in which a second line having a third color and a width of an M pixel where the width is set to N=M+α (M being an integer equal to or greater than 1, α being an integer equal to or greater than 0) is displayed on a background image having a fourth color. The shift amount adjuster is configured to adjust a shift amount when the display position of the primary adjusting sub-frame image on the projection surface and the display position of the secondary adjusting sub-frame image on the projection surface are shifted relatively to each other.

An adjusting method of the present disclosure is a method for adjusting a shift amount of a projection type image display apparatus. The projection type image display apparatus is configured to display an image formed of an image frame on a projection surface by projecting a plurality of sub-frame images forming the image frame onto the projection surface. The projection type image display apparatus is also configured to be capable of optically shifting projection positions of the sub-frame images when the sub-frame images are projected onto the projection surface. The adjusting method includes:

generating a primary adjusting sub-frame image that has a design in which a first line having a first color and a width of an N pixel (N being a natural number) is displayed on a background image having a second color;

generating a secondary adjusting sub-frame image that has a design in which a second line having a third color and a width of an M pixel where the width is set to N=M+α (M being an integer equal to or greater than 1, α being an integer equal to or greater than 0) is displayed on a background image having a fourth color; and shifting the display position of the primary adjusting sub-frame image on the projection surface and the display position of the secondary adjusting sub-frame image on the projection surface relative to each other.

The projection type image display apparatus of the present disclosure is effective in allowing easy adjustment of the shift amount when image light is optically shifted.

BRIEF DESCRIPTION OF DRAWINGS

FIG. 8 is a schematic chart of a base image signal serving as a basis for a projection image in accordance with the first exemplary embodiment;

FIG. 20 is a chart showing a variation of the second exemplary embodiment.

DETAILED DESCRIPTION OF THE INVENTION

Hereinafter, exemplary embodiments are detailed with reference to the accompanying drawings as appropriate. However, unnecessarily detailed description may be omitted. For instance, the detailed description of a matter already well known and the repeated description of substantially identical configurations may be omitted. This is to avoid the following description from being unnecessarily redundant and to help those skilled in the art easily understand the present disclosure.

The accompanying drawings and the following description are provided to help those skilled in the art sufficiently understand the present disclosure. The drawings and the description are not intended to limit the subject matter described in the claims.

First Exemplary Embodiment

Hereinafter, the first exemplary embodiment is described with reference to FIG. 1 through FIG. 13.

[1-1. Optical Configuration of Projector]

Figure 1:
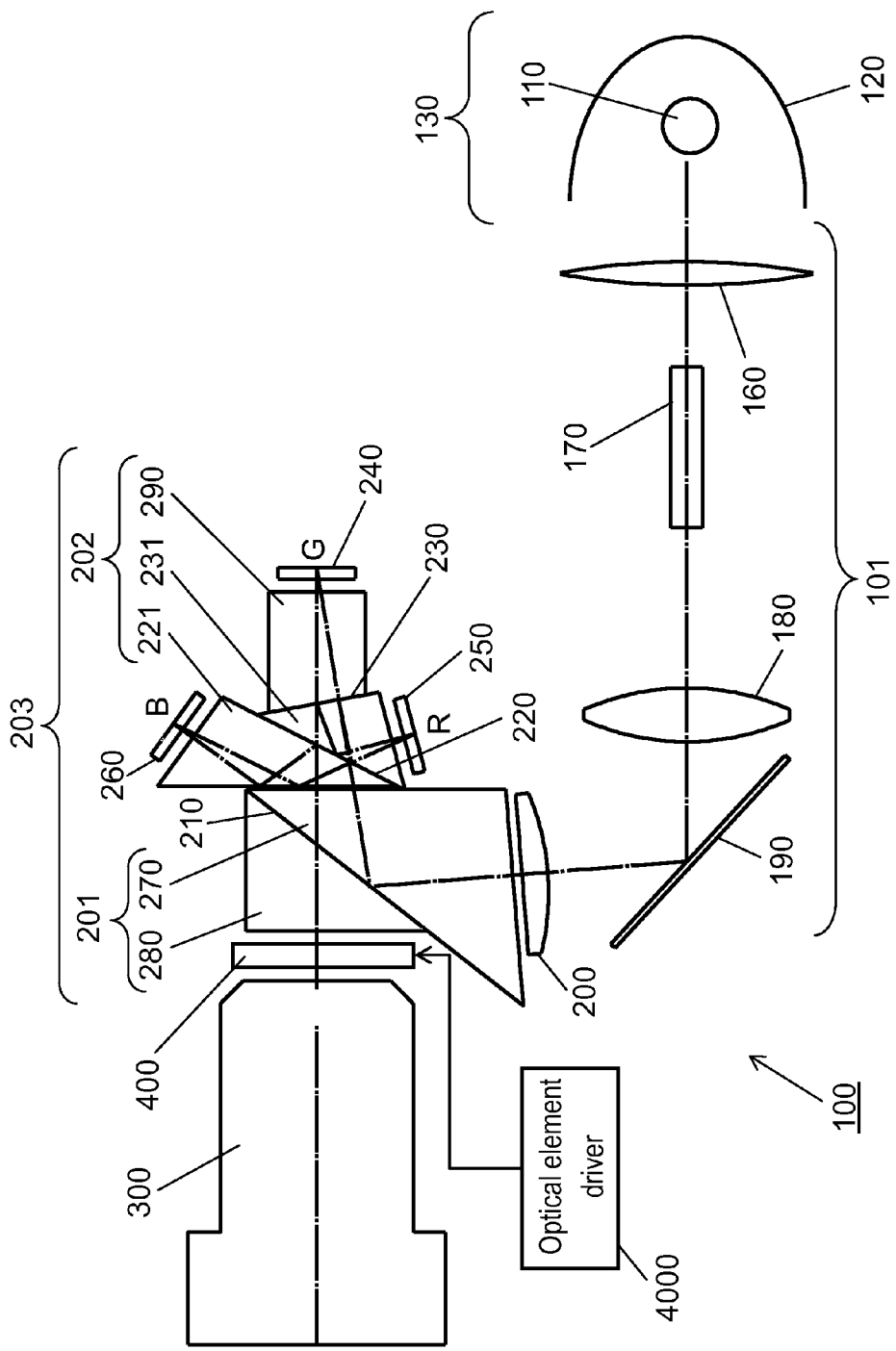
FIG. 1 is a diagram showing an example of an optical configuration of a projection type image display apparatus in accordance with a first exemplary embodiment.

Projector 100 as a projection type image display apparatus is outlined with reference to the schematic diagram of the optical configuration of FIG. 1.

FIG. 1 is a diagram showing an example of the optical configuration of the projection type image display apparatus (projector 100) in accordance with the first exemplary embodiment.

Projector 100 includes the following elements: light source 130; illumination optical system 101; prism block 203 including total reflection prism 201 and color prism 202; plate glass 400 as an optical element; and projection optical system 300.

Light source 130 includes arc tube 110 and reflector 120 for reflecting white light emitted by arc tube 110. Arc tube 110 emits white luminous fluxes that include red light, green light, and blue light having different wavelength ranges each other. For instance, arc tube 110 is formed of an ultrahigh pressure mercury lamp or a metal halide lamp. Reflector 120 reflects the luminous fluxes that have been emitted from arc tube 110 disposed in the focal position of reflector 120, and emits the luminous fluxes forward as parallel light.

The white light emitted from light source 130 is input to illumination optical system 101.

Illumination optical system 101 includes lens 160, rod 170, lens 180, and mirror 190. Illumination optical system 101 leads the luminous fluxes emitted from light source 130 to digital mirror devices (hereinafter being referred to as "DMDs") 240, 250, and 260. Rod 170 is a columnar glass member for totally reflecting the light inside thereof. The luminous fluxes emitted from light source 130 reflect a plurality of times in rod 170. Thus, the light intensity distribution on the exit face of rod 170 becomes substantially uniform.

Lens 180 is a relay lens for focusing, onto DMDs 240, 250, and 260, the luminous fluxes on the exit face of rod 170. Mirror 190 reflects the luminous fluxes through lens 180. The reflected luminous fluxes are incident on field lens 200. Field lens 200 is a lens for converting the incident light into substantially parallel luminous fluxes. The luminous fluxes through field lens 200 are incident on total reflection prism 201.

Total reflection prism 201 is formed of prism 270 and prism 280. Airspace 210 is present in a vicinal plane between prism 270 and prism 280. Airspace 210 is a thin air layer. Airspace 210 totally reflects the luminous fluxes incident at an angle equal to or larger than the critical angle. The totally reflected luminous fluxes are incident on color prism 202.

Color prism 202 is formed of including prism 221, prism 231, and prism 290. Dichroic film 220 for reflecting blue light is disposed in a vicinal plane between prism 221 and prism 231. Dichroic film 230 for reflecting red light is disposed in a vicinal plane between prism 231 and prism 290. DMDs 240, 250, and 260 are provided to color prism 202.

Each of DMD 240, DMD 250, and DMD 260 has 1920× 1080 micro mirrors. Each of DMD 240, DMD 250, and DMD 260 deflects corresponding micro mirrors in response to an image signal. Thus, each of DMD 240, DMD 250, and DMD 260 separates the light incident on the corresponding DMD into the light to be incident on projection optical system 300 and the light to be reflected outside the effective range of projection optical system 300. Thus, each of DMD 240, DMD 250, and DMD 260 modulates the light incident on the corresponding DMD in response to the image signal. Green light is incident on DMD 240. Red light is incident on DMD 250. Blue light is incident on DMD 260.

Among the luminous fluxes reflected by DMD 240, DMD 250, and DMD 260, the luminous fluxes to be incident on projection optical system 300 are combined in color prism 202. The combined luminous fluxes are incident on total reflection prism 201. The luminous fluxes having entered total reflection prism 201 are incident on airspace 210 at an angle equal to or smaller than the critical angle. Thus, the luminous fluxes are transmitted through airspace 210 and incident on projection optical system 300.

Projection optical system 300 is an optical system for expanding the incident luminous fluxes. Projection optical system 300, which has a focusing function, a zooming function and others, projects the image light from DMD 240, DMD 250, and DMD 260 onto the projection surface, and thereby displays an image corresponding to an image signal on the projection surface. Hereinafter, the projection surface is also referred to as a "screen".

Plate glass 400 is disposed in a plane perpendicular to the optical axis of projection optical system 300. As will be described later, the inclination of the plate glass is controlled by optical element driver 4000. In projector 100, optical element driver 4000 controls the inclination of plate glass 400 at high speed (for each sub-frame image). Thereby, the projector can displace (shift) the relative display positions of a plurality of sub-frame images forming an image frame on the projection surface (screen) with a moving amount smaller than the size of one pixel. This allows projector 100 to display, on the projection surface, an image having a resolution (the number of pixels) larger than the number of micro mirrors (the number of pixels) of each of DMD 240, DMD 250, and DMD 260. The detailed description will be given later.

[1-2. Configuration between Prisms and Projection Lenses]

Next, a description is provided for optical element driver 4000 for controlling the inclination of plate glass 400 as an optical element. As shown in FIG. 1, plate glass 400 is disposed between prism block 203 and projection optical system 300.

Figure 2:
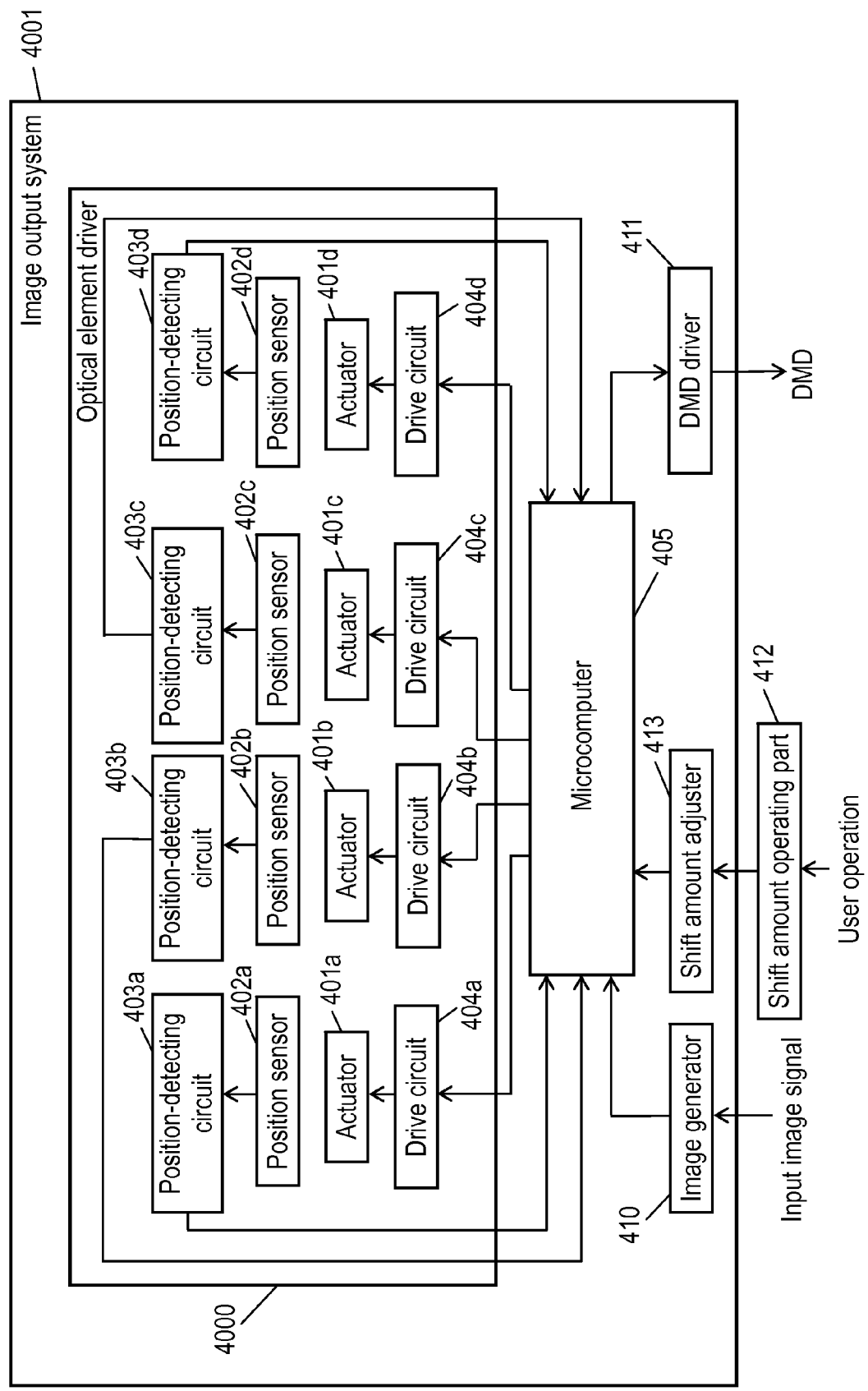
FIG. 2 is a block diagram that shows a circuit configuration example of an image output system including an optical element driver in accordance with the first exemplary embodiment.

FIG. 2 is a block diagram that shows a circuit configuration example of an image output system including optical element driver 4000 in accordance with the first exemplary embodiment.

Figure 3:
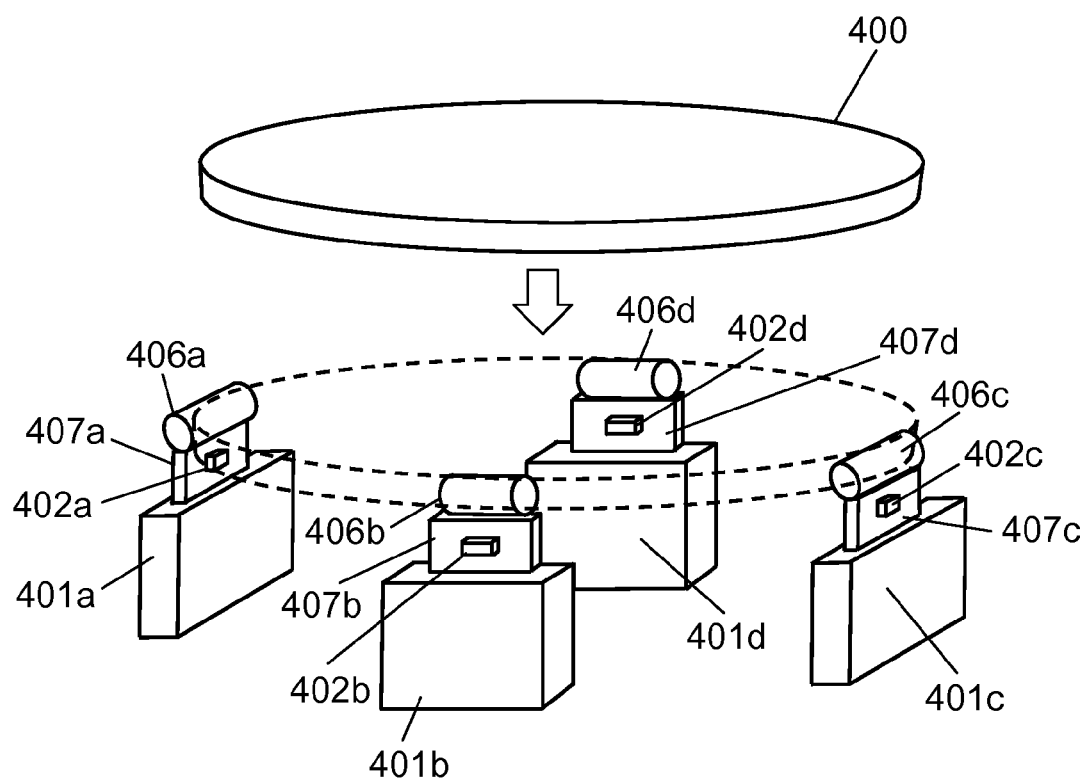
FIG. 3 is a diagram showing a schematic configuration of the optical element driver in accordance with the first exemplary embodiment.

FIG. 3 is a diagram showing a schematic configuration of optical element driver 4000 in accordance with the first exemplary embodiment.

As shown in FIG. 2, image output system 4001 included in projector 100 includes the following elements: optical element driver 4000; microcomputer 405; image generator 410; shift amount adjuster 413; and DMD driver 411.

Optical element driver 4000 of this exemplary embodiment includes four actuators 401 (actuators 401a, 401b, 401c, and 401d), four drive circuits 404 (drive circuits 404a, 404b, 404c, and 404d), four position sensors 402 (position sensors 402a, 402b, 402c, and 402d), and four position-detecting circuits 403 (position-detecting circuits 403a, 403b, 403c, and 403d). As shown in FIG. 3, actuators 401 (actuators 401a, 401b, 401c, and 401d) include movable parts 407 (movable parts 407a, 407b, 407c, and 407d) and connecting members 406 (connecting members 406a, 406b, 406c, and 406d), respectively. In this exemplary embodiment, plate glass 400 in a circular plate shape is used as the optical element.

As shown in FIG. 3, four ends of plate glass 400 are connected to movable parts 407a, 407b, 407c, and 407d of actuators 401a, 401b, 401c, and 401d by connecting members 406a, 406b, 406c, and 406d, respectively.

In this exemplary embodiment, a voice coil motor (hereinafter being referred to as a "VCM") is used as each of actuators 401.

Figure 4:
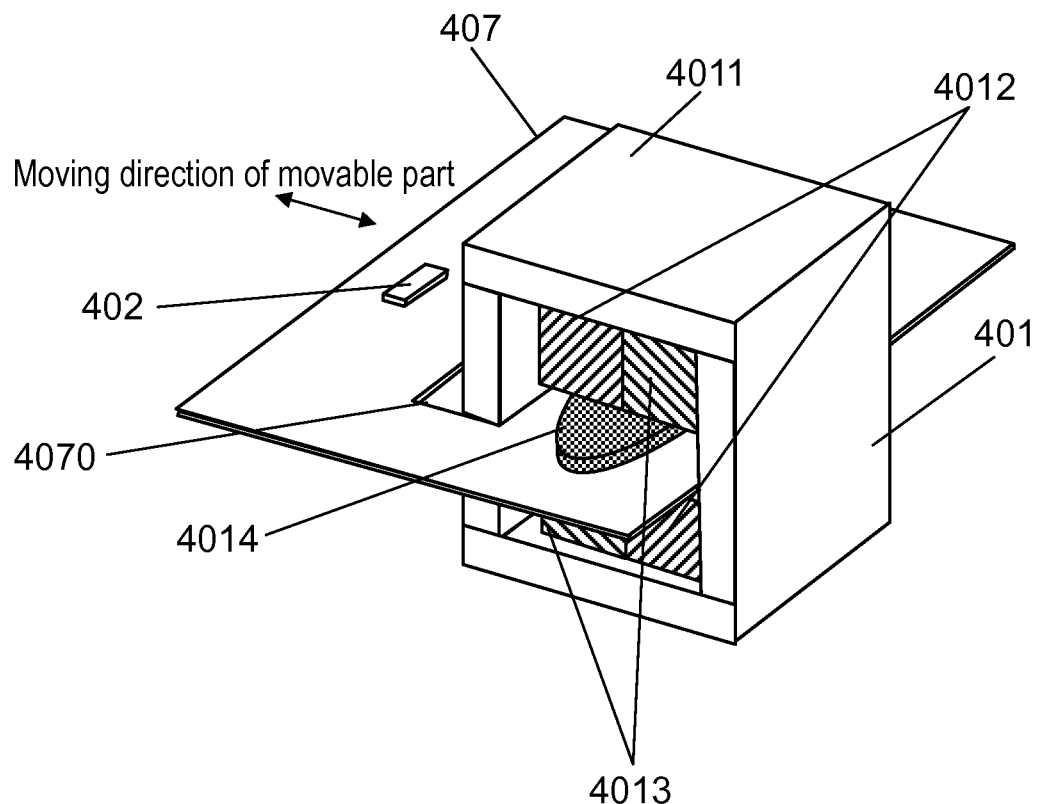
FIG. 4 is a diagram showing an example of a structure of a voice coil motor.

FIG. 4 is a diagram showing an example of a structure of a VCM.

The VCM has the following structure, for example. Inside yoke 4011 in a square cylindrical shape, permanent magnets having different magnetic polarities each other (N-pole permanent magnets 4012 and S-pole permanent magnets 4013) are opposite to each other with a predetermined distance provided therebetween. Between permanent magnets 4012 and 4013 opposite to each other, movable part 407 having coil 4014 is disposed.

This movable part 407 has guide window 4070. Yoke 4011 is inserted into guide window 4070. Coil 4014 provided to movable part 407 is disposed between permanent magnets 4012 and 4013 opposite to each other.

When a drive signal current is supplied to coil 4014, movable part 407 moves in the directions of the arrows (two uniaxial directions) shown in FIG. 4. The moving amount of movable part 407 changes depending on the magnitude of the drive signal current flowing through coil 4014. The moving amount of movable part 407 is detected via position sensor 402 mounted to movable part 407. The output signal of position sensor 402 changes depending on the position of movable part 407. Position-detecting circuit 403 shown in FIG. 2 detects the output signal, so that the moving amount of movable part 407 is detected. Position sensor 402 is a Hall element for detecting a magnetic field using the Hall effect, for example. However, the position sensor is not limited to a Hall element.

A slight clearance is provided between movable part 407 having coil 4014 and each of permanent magnets 4012 and 4013. Thus, movable part 407 can be displaced to a degree allowed by the slight clearance in application of the force perpendicular to the uniaxial directions along which the movable part is moved by the drive signal current. Thus, movable part 407 can incline within this slight clearance.

Figure 6:
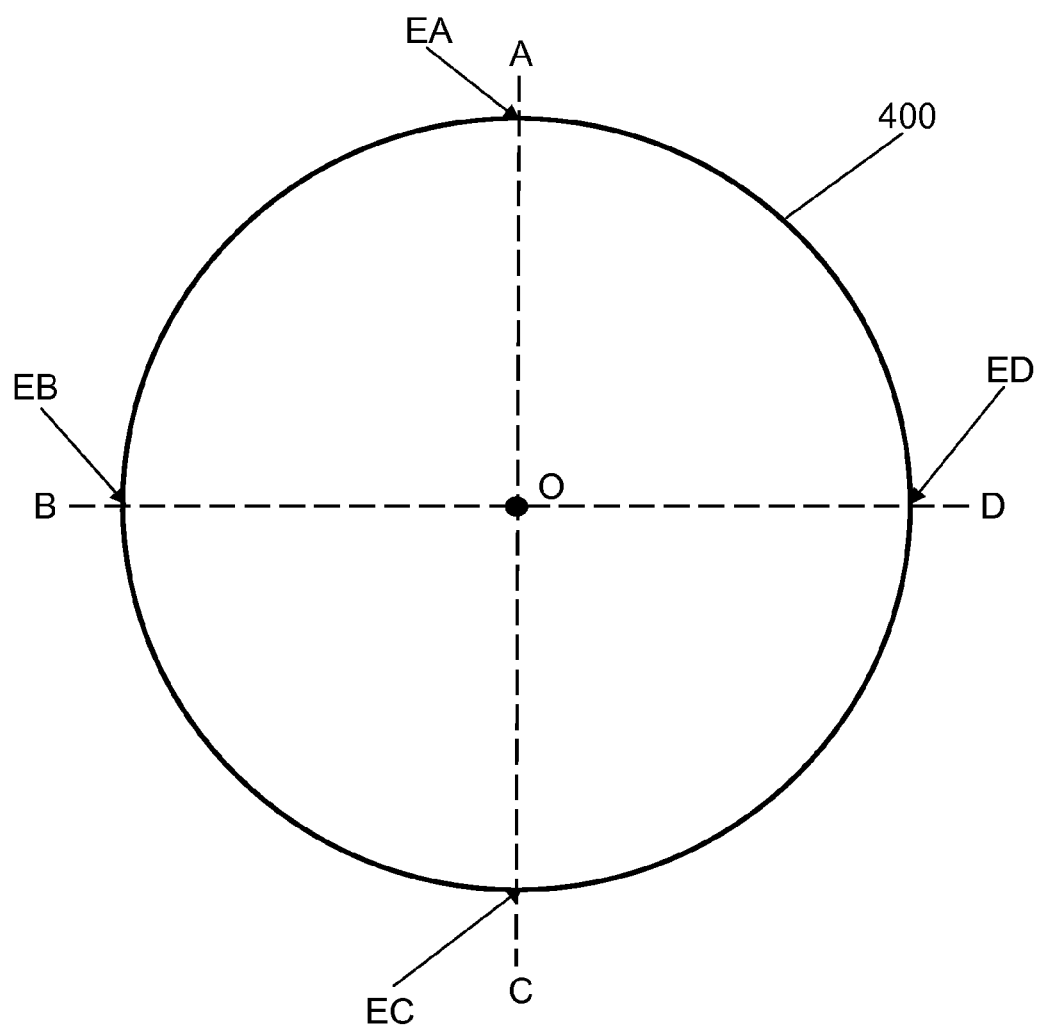
FIG. 6 is a plan view of the plate glass in accordance with the first exemplary embodiment.

FIG. 6 is a plan view of plate glass 400 in accordance with the first exemplary embodiment.

As shown in FIG. 6, connecting members 406 connected to movable parts 407 of actuators 401 are connected to ends EA, EB, EC, and ED of plate glass 400. Ends EA, EB, EC, and ED are the cross points between the rim of plate glass 400 and the A-C axis and the B-D axis, which cross orthogonal to each other at plane center O of plate glass 400.

In this exemplary embodiment, the cross points between the A-C axis and the rim of plate glass 400 are defined as ends EA and EC. The cross points between the B-D axis and the rim of plate glass 400 are defined as ends EB and ED. As also shown in FIG. 3, end EA is connected to movable part 407a of actuator 401a by connecting member 406a. End EB is connected to movable part 407b of actuator 401b by connecting member 406b. End EC is connected to movable part 407c of actuator 401c by connecting member 406c. End ED is connected to movable part 407d of actuator 401d by connecting member 406d.

As shown in FIG. 2, actuator 401a is driven by drive circuit 404a, actuator 401b is driven by drive circuit 404b, actuator 401c is driven by drive circuit 404c, and actuator 401d is driven by drive circuit 404d. Drive circuits 404a, 404b, 404c, and 404d are controlled by corresponding control signals from microcomputer 405. That is, based on the control signals from microcomputer 405, movable part 407a through 407d of actuators 401a through 401d are moved in the uniaxial directions by the drive signal current output from drive circuits 404a through 404d, respectively.

The output signal of position sensor 402a disposed on movable part 407a is output to position-detecting circuit 403a. The output signal of position sensor 402b disposed on movable part 407b is output to position-detecting circuit 403b. The output signal of position sensor 402c disposed on movable part 407c is output to position-detecting circuit 403c. The output signal of position sensor 402d disposed on movable part 407d is output to position-detecting circuit 403d. That is, the positions of movable parts 407a through 407d are detected by position-detecting circuits 403a through 403d connected to position sensors 402a through 402d, respectively.

The signals (detection signals) output as the detection results from position-detecting circuits 403a through 403d are input to microcomputer 405. Based on the detection signals, microcomputer 405 monitors the positions of movable parts 407a through 407d of actuators 401a through 401d, respectively. Based on the detection signals, microcomputer 405 controls drive circuits 404a through 404d and thereby performs servo control of actuators 401a through 401d, respectively.

In this manner, microcomputer 405 works as an optical element controller for controlling the inclination of plate glass 400. The optical element controller is implemented by executing software preprogrammed to perform the above operation, in microcomputer 405. However, the present disclosure is not limited to this configuration. For instance, projector 100 may be configured to include a circuit block configured to operate as the optical element controller.

As described above, in this exemplary embodiment, one image frame (one frame) is formed of a plurality of sub-frame images. A sub-frame image signal for displaying a sub-frame image on the screen is obtained by signal processing of an input image signal in image generator 410. When a sub-frame image signal is input to microcomputer 405, based on this sub-frame image signal, microcomputer 405 generates synchronizing signals to be supplied to drive circuits 404a through 404b, and generates a DMD drive signal and a synchronizing signal for controlling DMD driver 411.

Projector 100 is configured so that microcomputer 405 (optical element controller) controls optical element driver 4000 so as to control the inclination of plate glass 400 and thereby shift display positions of a plurality of sub-frame images forming an image frame on the screen. The shift amount at this time is adjusted by shift amount adjuster 413.

In this exemplary embodiment, the shift amount is adjusted as follows. The user adjusts the shift amount so that the relative display positions of a "primary adjusting sub-frame image" and a "secondary adjusting sub-frame image" to be described later are set to appropriate positions on the screen. Shift amount adjuster 413 performs the shift amount adjustment at this time in response to the user operation. Microcomputer 405 (optical element controller) controls the inclination of plate glass 400 with the adjusted shift amount. As a result, the display position of each sub-frame image on the screen is shifted with the adjusted shift amount.

Specifically, when the user operates shift amount operating part 412, in response to the operation, a signal indicating the adjustment amount is input from shift amount adjuster 413 to microcomputer 405. At this time, the user operates shift amount operating part 412 so that the relative display positions of the "primary adjusting sub-frame image" and the "secondary adjusting sub-frame image" on the screen are in appropriate positions. Thus, the display position of each sub-frame image on the screen is adjusted so as to shift with a moving amount equal to or smaller than 1 pixel with respect to the display position of the previous sub-frame image. This adjustment will be detailed later. Based on the signal indicating this adjustment amount, microcomputer 405 (optical element controller) controls drive circuits 404a through 404d. This control adjusts the moving amounts of movable parts 407a through 407d of actuators 401a through 401d, respectively.

The shift amount (in adjustment of the shift amount) when the "primary adjusting sub-frame image" and the "secondary adjusting sub-frame image" are projected onto the screen is defined as S. The shift amount (the shift amount in normal operation) when a general image (e.g. an image based on an input image signal) except the "primary adjusting sub-frame image" and the "secondary adjusting sub-frame image" is projected onto the projection surface is defined as So. In this case, shift amount adjuster 413 adjusts the respective shift amounts so as to satisfy the following equation:

$$So = S \times (\alpha\%2 + 1)/2$$

where $\alpha\%2$ represents the remainder when $\alpha$ is divided by 2. This exemplary embodiment shows an example of $\alpha=1$, and shift amount So at this time is expressed by the following equation:

$$So = S \times (1+1)/2 = S$$

which shows shift amount So is equal to shift amount S. That is, projector 100 in this exemplary embodiment projects a general image on the screen with shift amount So that is equal to shift amount S adjusted by projecting adjusting pattern images onto the screen.

For instance, shift amount operating part 412 may be an operating key provided to the body of projector 100 or a key allocated to a remote controller used for operating projector 100.

FIG. 2 shows shift amount adjuster 413 as one circuit block but the present disclosure is not limited to this configuration. Shift amount adjuster 413 may be implemented by executing software preprogrammed to perform the above operation, in microcomputer 405.

Hereinafter, a description is provided for the operation of optical element driver 4000 configured as above.

[1-3. Operation]

Figure 5:
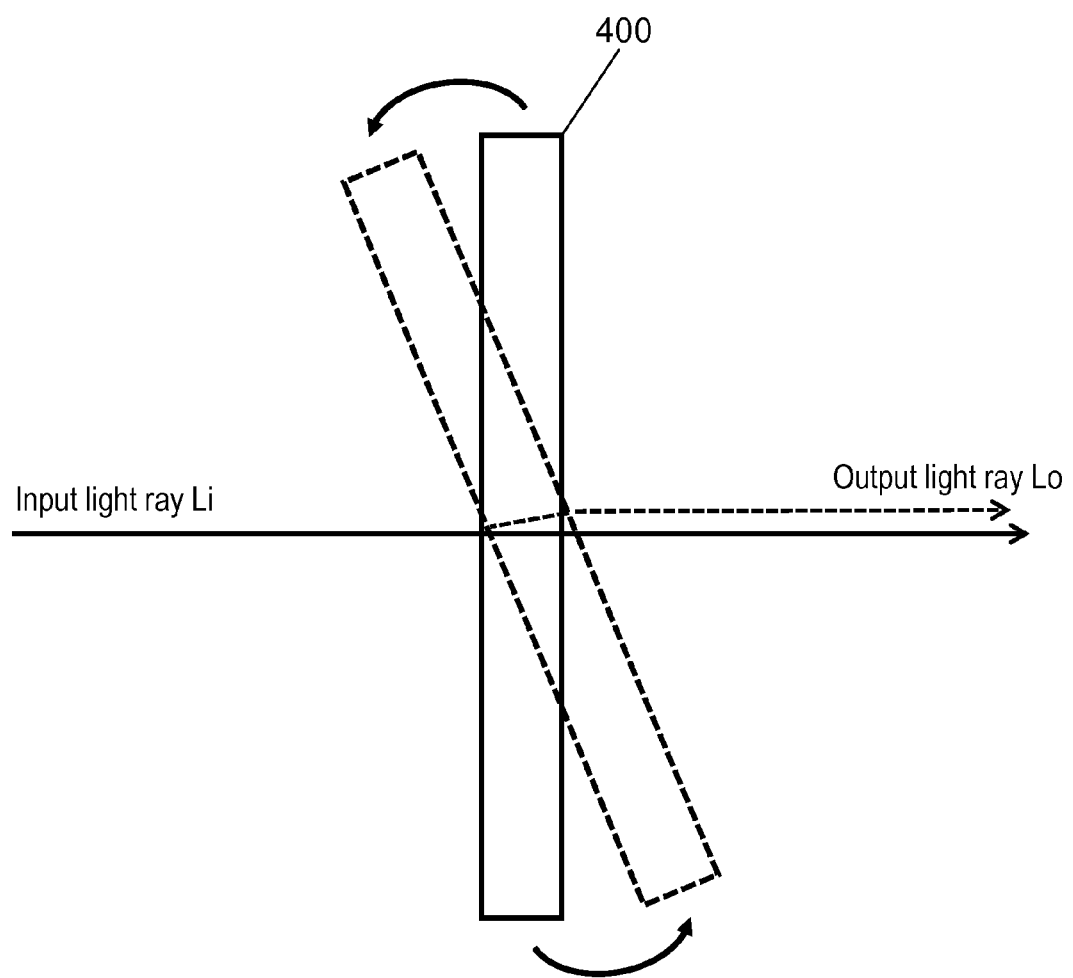
FIG. 5 is a diagram for explaining a principle of changing an optical path using a plate glass.

FIG. 5 is a diagram for explaining a principle of changing an optical path using plate glass 400.

Figure 7:
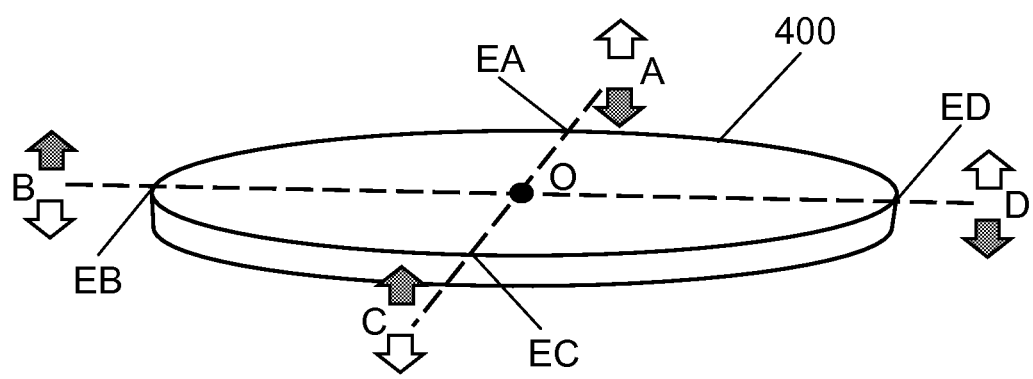
FIG. 7 is a diagram for explaining a movement of the plate glass in accordance with the first exemplary embodiment.

FIG. 7 is a diagram for explaining a movement of plate glass 400 in accordance with the first exemplary embodiment.

First, a description is provided for the operation when the planes of plate glass 400 are orthogonal to input light ray Li. At this time, as shown by the solid line in FIG. 5, input light ray Li goes straight without being refracted in the interface between the plane (incident plane) of plate glass 400 passed by input light ray Li and the air. Thus, input light ray Li passes through plate glass 400 without being refracted. Also in the interface between the air and the plane (exit plane) of plate glass 400 passed by the light having exited from plate glass 400 (output light ray Lo), plate glass 400 has a parallel plane and output light ray Lo and the interface are orthogonal to each other. Thus, output light ray Lo goes straight without being refracted. Therefore, when input light ray Li is image light, the position of the image displayed by output light ray Lo on the screen is the same as the position of the image displayed on the screen by input light ray Li going straight. That is, when the planes of plate glass 400 are orthogonal to input light ray Li, the display position of the image on the screen does not shift.

Next, a description is provided for the operation when the planes of plate glass 400 are not orthogonal to input light ray Li as shown by the broken lines in FIG. 5. At this time, input light ray Li is refracted in the interface between the incident plane of plate glass 400 and the air. Thus, input light ray Li is refracted and incident on plate glass 400 and passes through plate glass 400. Also in the interface between the exit plane of plate glass 400 and the air, plate glass 400 has a parallel plane and output light ray Lo is not orthogonal to the interface. Thus, output light ray Lo is refracted.

The angle at which input light ray Li is refracted when entering plate glass 400 is equal to the angle at which output light ray Lo is refracted when exiting from plate glass 400. Thus, when input light ray Li is image light, output light ray Lo of the image light makes parallel translation corresponding to the inclination, in the inclination direction of plate glass 400. As a result, the display position of the image, when the refracted light exits from plate glass 400 and is projected onto the screen, is shifted, by the amount of the parallel translation, with respect to the image when input light ray Li goes straight and is displayed onto the same screen.

Using this principle, projector 100 shifts the display position of an image on the screen. In optical element driver 4000, ends EA, EB, EC, and ED are rockably connected to movable parts 407a through 407d by connecting members 406a through 406d of actuators 401a through 401d, respectively. Here, as shown in FIG. 6, ends EA and EC are on the A-C axis and ends EB and ED are on the B-D axis. The two axes pass through center O of plate glass 400 and cross orthogonal to each other.

Microcomputer 405 (optical element controller) controls drive circuits 404a through 404d so that the drive circuits drive actuators 401a through 401d, so that the inclination of plate glass 400 is controlled with the position of center O kept constant. Microcomputer 405 (optical element controller) is capable of controlling plate glass 400 in the following manner. For instance, as shown in FIG. 7, the A-C axis is rotated around the B-D axis as a rotary axis so that end EA is moved upward by a predetermined amount and end EC is moved downward by a predetermined amount. The B-D axis is rotated around the A-C axis as a rotary axis so that end EB is moved downward by a predetermined amount and end ED is moved upward by a predetermined amount. This operation changes the optical path of image light (light for displaying an image) incident on plate glass 400, and thus the image is displayed in the position (on the screen) corresponding to the inclination of plate glass 400.

In this exemplary embodiment, the image displayed on the screen is an aggregate of pixels displayed on the screen by respective micro mirrors of DMDs 240, 250, and 260. Hereinafter, the display position of an image displayed on the screen is also referred to as a "display position of a pixel", and the shift of an image on the screen as a "pixel shift".

Image generator 410 generates signals for a predetermined plurality of sub-frame images, for each frame in an input image signal. The number of sub-frame images is two or four but may be other numerical values. The projection position of each sub-frame image on the screen is shifted by optical element driver 4000. The number of pixels of each sub-frame image is substantially equal to the number of pixels (the number of micro mirrors) of each of DMDs 240, 250, and 260.

[1-4. Output Operation of Double Density Image]

The double density image is a term used when one image frame is formed of two sub-frame images. When projector 100 outputs a double density image, image generator 410 generates signals for two sub-frame images from an input image signal for one frame.

Microcomputer 405 generates synchronizing signals for synchronizing DMD driver 411 and drive circuits 404a through 404d, from a sub-frame image signal generated in image generator 410.

The sub-frame image signal generated in image generator 410 is output from microcomputer 405 to DMD driver 411. DMD driver 411 generates DMD drive signals so that each of DMDs 240, 250, and 260 outputs a sub-frame image based on the sub-frame image signal at a speed twice the frame rate of the base image signal.

Microcomputer 405 (optical element controller) generates control signals so as to drive plate glass 400 in synchronization with DMD driver 411 and to shift the projection positions of pixels on the screen. The microcomputer outputs the control signals to drive circuits 404a through 404d. Based on the control signals, drive circuits 404a through 404d generate actuator drive signals and drive actuators 401a through 401d.

Figure 9:
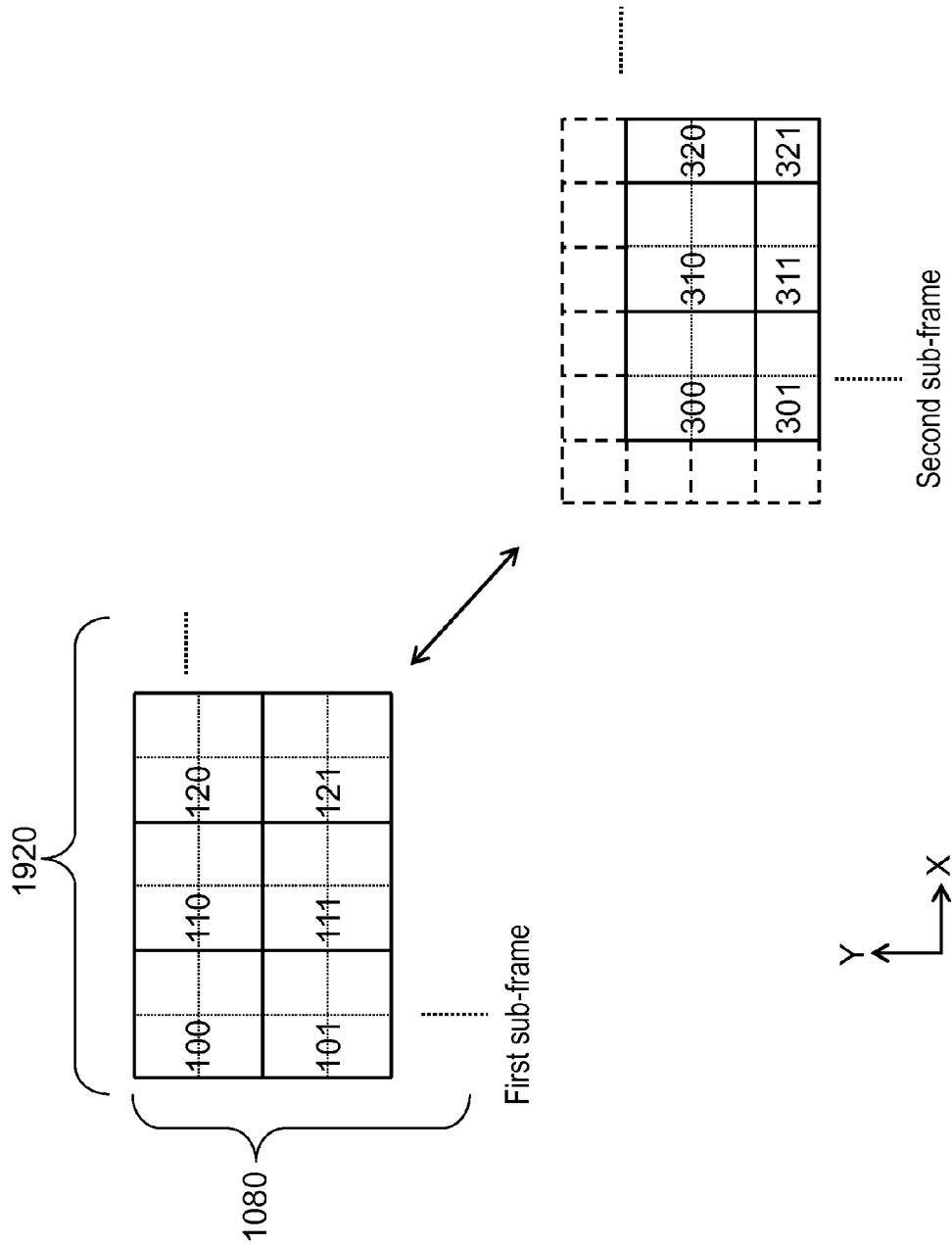
FIG. 9 is a schematic chart of sub-frame image signals for a double density image generated from the base image signal in accordance with the first exemplary embodiment.

A description is provided for a specific example of the operation of image output system 4001 with reference to FIG. 8 and FIG. 9.

In projector 100, each of DMDs 240, 250, and 260 is capable of outputting an image having 1920 pixels in the horizontal direction and 1080 pixels in the vertical direction. Projector 100 is also capable of shifting the projection position of each sub-frame image by driving plate glass 400 using actuators 401a through 401d. At this time, the moving amount (shift amount) is adjusted to ½ pixel in the horizontal direction and ½ pixel in the vertical direction. Here, shifting the projection position by ½ pixel (or one-half pixel) means that the projection position of a pixel on the screen is moved with the moving amount one half of the size of the pixel. This shift amount is adjusted by the method to be described later.

FIG. 8 is a schematic chart of the base image signal serving as a basis for a projection image in accordance with the first exemplary embodiment. FIG. 8 shows the base image signal serving as a basis for generating sub-frame images in image output system 4001 of projector 100. The base image signal is an image signal having 3840 pixels in the horizontal direction and 2160 pixels in the vertical direction (an image signal of a so-called 4K2K image). The number of pixels of this base image signal is four times the number of pixels (the number of micro mirrors) of each of DMDs 240, 250, and 260. This base image signal may be an image signal input directly from an external device, or a signal obtained by upconverting an input image signal having a lower resolution (a smaller number of pixels) in the system of projector 100.

In FIG. 8, one cell represents 1 pixel, and the numerical value in each cell is a numerical value that changes depending on the base image signal. In FIG. 8, the numbers shown in the horizontal direction indicate the column numbers of the pixels. The numbers shown in the vertical direction indicate the row numbers of the pixels.

A description is provided for a method for generating a sub-frame image signal in image generator 410.

FIG. 9 is a schematic chart of sub-frame image signals for a double density image generated from the base image signal in accordance with the first exemplary embodiment. In FIG. 9, one cell shown by the solid lines represents 1 pixel, and each broken line shows the size of one half of 1 pixel. The numerical value in each cell is a numerical value that changes depending on the base image signal.

As shown in FIG. 8, the base image signal is denoted with the column numbers of the pixels, such as 0, 1, 2, 3, 4, 5 . . . in the horizontal direction, and with the row numbers of the pixels, such as 0, 1, 2, 3 . . . in the vertical direction. In this exemplary embodiment, sub-frame image signals for a double density image (a first sub-frame image signal and a second sub-frame image signal) are generated by the following procedure.

1) The first sub-frame image signal is a signal obtained by sampling a pixel that satisfies the following conditions in the base image signal. When the numerical value, indicating the order of the number of the pixel from column number 0 in the horizontal direction, is divided by 2, the remainder is 0. Further, when the numerical value, indicating the order of the number of the pixel from row number 0 in the vertical direction, is divided by 2, the remainder is 0.

2) The second sub-frame image signal is a signal obtained by sampling a pixel that satisfies the following conditions in the base image signal. When the numerical value, indicating the order of the number of the pixel from column number 0 in the horizontal direction, is divided by 2, the remainder is 1. Further, when the numerical value, indicating the order of the number of the pixel from row number 0 in the vertical direction, is divided by 2, the remainder is 1.

Thus, the first sub-frame image signal and the second sub-frame image signal are generated. The image projected onto the screen, based on the first sub-frame image signal, is a first sub-frame image. The image projected onto the screen, based on the second sub-frame image signal, is a second sub-frame image. Two sub-frame images of the first sub-frame image and the second sub-frame image form one image frame (a double density image). In this exemplary embodiment, the relative projection positions of the first sub-frame image and the second sub-frame image on the screen are shifted.

Specifically, as shown in FIG. 9, the second sub-frame image is shifted with respect to the first sub-frame image by ½ pixel in the horizontal direction (+X direction) and ½ pixel in the vertical direction (−Y direction). The first sub-frame image is shifted with respect to the second sub-frame image by ½ pixel in the horizontal direction (−X direction) and ½ pixel in the vertical direction (+Y direction). By shifting the first and second sub-frame images by ½ pixel in both horizontal and vertical directions each other, projector 100 is capable of displaying a double density image that has a resolution (the number of pixels) larger than the number of pixels (the number of micro mirrors) of each of DMDs 240, 250, and 260.

Based on the first sub-frame image signal and the second sub-frame image signal, each of DMDs 240, 250, and 260 outputs a sub-frame at a speed twice the frame rate (output frame rate) of the base image signal. Specifically, when the output frame rate is 60 Hz, for example, each of DMDs 240, 250, and 260 outputs a sub-frame at 120 Hz. At this time, actuators 401a through 401d are driven at 60 Hz, which is equal to the output frame rate.

Figure 10:
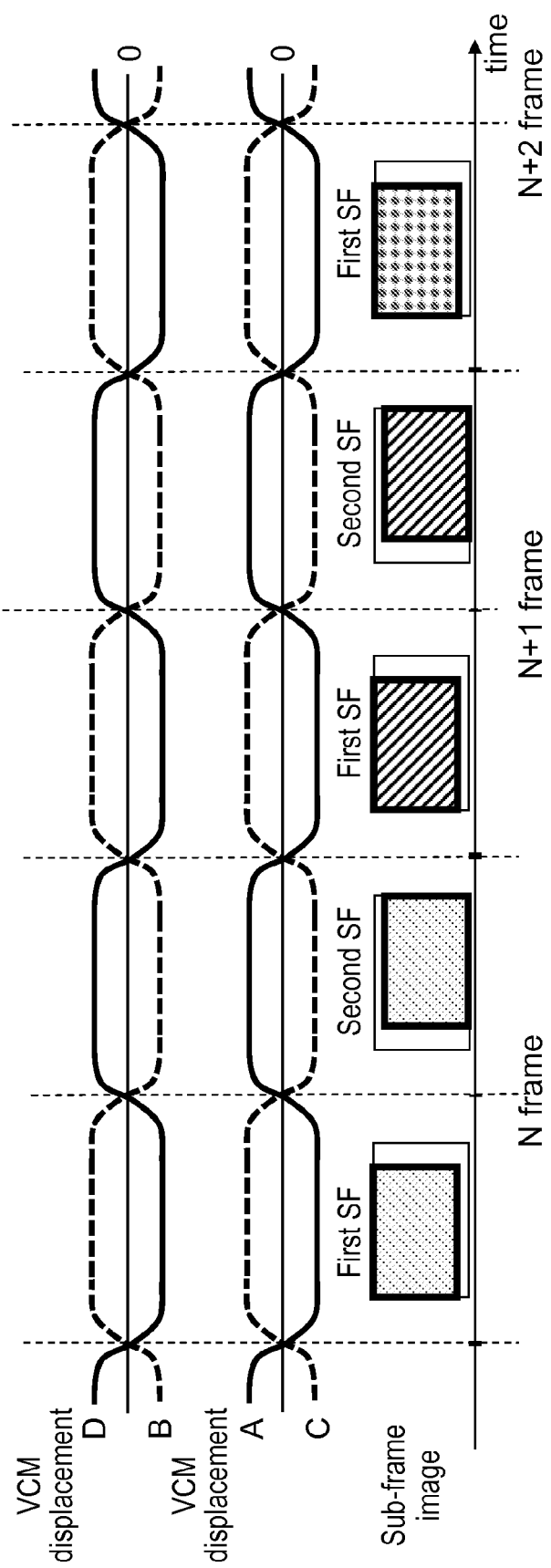
FIG. 10 is a schematic chart showing a state where sub-frame images are shifted so as to form a double density image in accordance with the first exemplary embodiment.

FIG. 10 is a schematic chart showing a state where sub-frame images are shifted so as to form a double density image in accordance with the first exemplary embodiment. FIG. 10 schematically shows the displacement (VCM displacement) instructed to actuators 401a through 401d and how the first sub-frame image (first SF) and the second sub-frame image (second SF) move when the sub-frame images are projected onto the screen. FIG. 10 simply shows the moving direction of each sub-frame image, and does not show the actual moving amount.

In the example shown in FIG. 10, microcomputer 405 (optical element controller) instructs actuator 401a of displacement A, and instructs actuator 401c of displacement C where displacement A is inverted. The waveform for instructing displacement A (displacement waveform) is a waveform that changes negatively in display of the first sub-frame image and changes positively in display of the second sub-frame image. The waveform for instructing displacement C (displacement waveform) is a waveform that changes positively in display of the first sub-frame image and changes negatively in display of the second sub-frame image. Microcomputer 405 (optical element controller) instructs actuator 401b of displacement B, and instructs actuator 401d of displacement D where displacement B is inverted. The displacement waveform for instructing displacement B is a waveform that changes positively in display of the first sub-frame image and changes negatively in display of the second sub-frame image. The displacement waveform for instructing displacement D is a waveform that changes negatively in display of the first sub-frame image and changes positively in display of the second sub-frame image. Thus, plate glass 400 rocks around the B-D axis and A-C axis as rotary axes.

In this exemplary embodiment, the shift amount of the first sub-frame image and the shift amount of the second sub-frame image are adjusted so that the second sub-frame image is projected in the position displaced by ½ pixel in both horizontal and vertical directions with respect to the first sub-frame image on the screen.

Thus, on the screen, the first sub-frame image (first SF) and the second sub-frame image (second SF) are projected in the positions displaced with each other by ½ pixel, which is caused by displacement of the optical path of the input image light both in horizontal and vertical directions. In this manner, a double density image is displayed on the screen.

[1-5. Output Operation of Quad Density Image]

The quad density image is a term used when one image frame is formed of four sub-frame images. When projector 100 outputs a quad density image, image generator 410 generates signals for four sub-frame images from an input image signal for one frame.

Microcomputer 405 generates synchronizing signals for synchronizing DMD driver 411 and drive circuits 404a through 404d, from a sub-frame image signal generated in image generator 410.

The sub-frame image signal generated in image generator 410 is output from microcomputer 405 to DMD driver 411. DMD driver 411 generates DMD drive signals so that each of DMDs 240, 250, and 260 outputs a sub-frame image based on the sub-frame image signal at a speed four times the frame rate of the base image signal.

Microcomputer 405 (optical element controller) generates control signals so as to drive plate glass 400 in synchronization with DMD driver 411 and to shift the projection positions of pixels on the screen. The microcomputer outputs the control signals to drive circuits 404a through 404d. Based on the control signals, drive circuits 404a through 404d generate actuator drive signals and drive actuators 401a through 401d.

Figure 11:
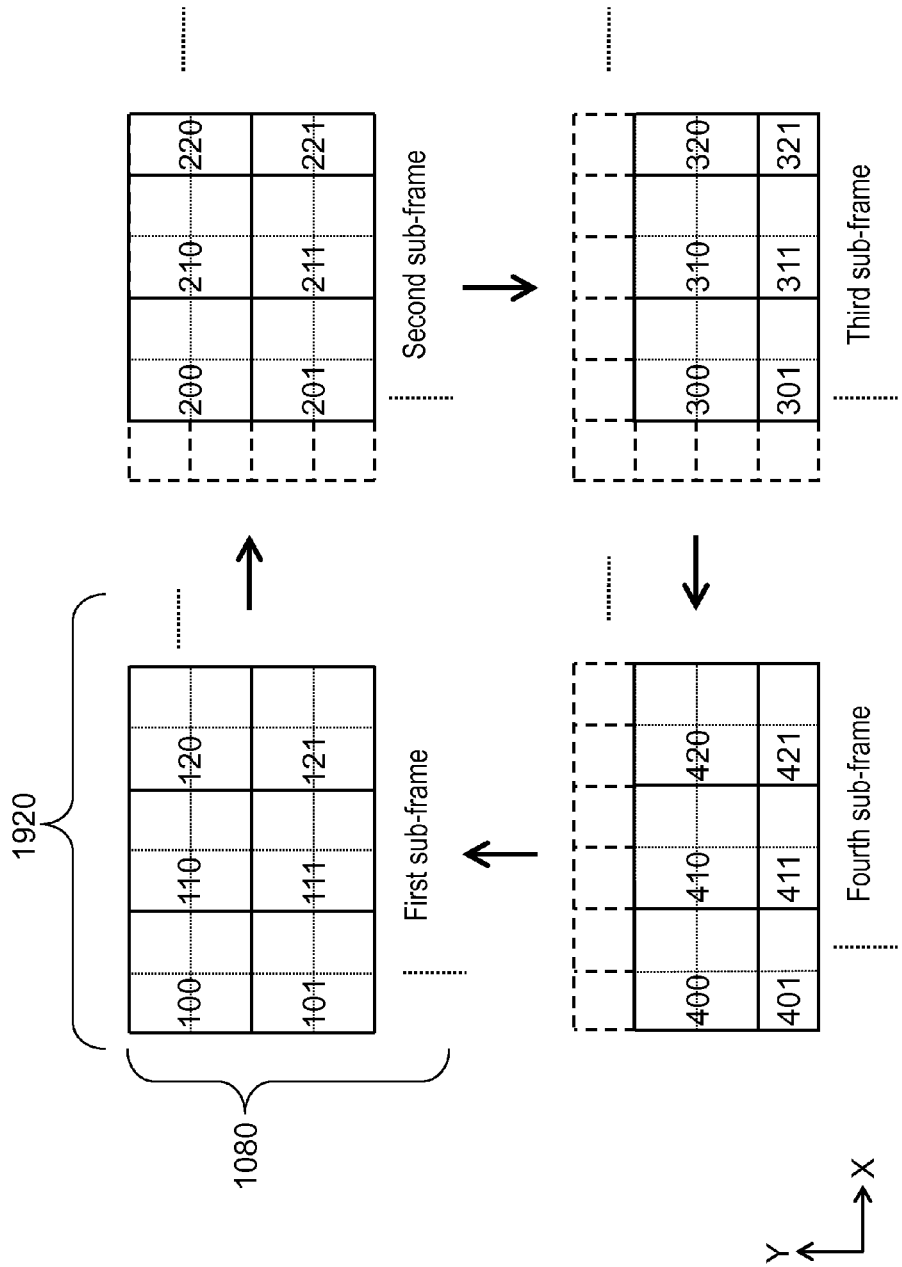
FIG. 11 is a schematic chart of sub-frame image signals for a quad density image generated from the base image signal in accordance with the first exemplary embodiment.
Figure 12:
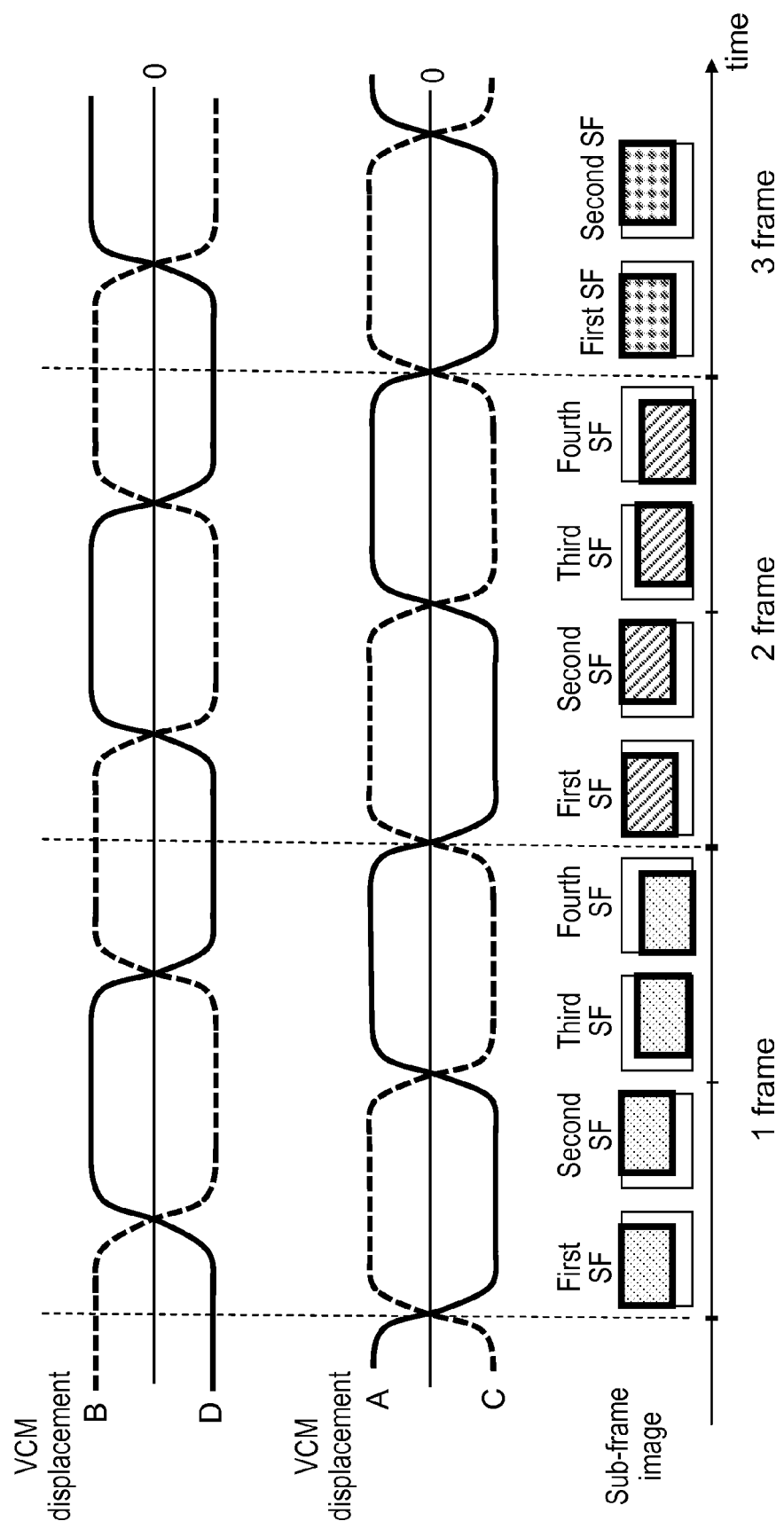
FIG. 12 is a schematic chart showing a state where sub-frame images are shifted so as to form a quad density image in accordance with the first exemplary embodiment.

A description is provided for a specific example of the operation of image output system 4001 with reference to FIG. 11 and FIG. 12. The resolution (number of pixels) of each of DMDs 240, 250, and 260 and the resolution (number of pixels) of the base image signal are equal to the case described in the output operation of the double density image. Thus, the repeated description is omitted.

A description is provided for a method for generating sub-frame image signals in image generator 410.

FIG. 11 is a schematic chart of sub-frame image signals for a quad density image generated from the base image signal in accordance with the first exemplary embodiment. In FIG. 11, the cell shown by the solid lines represents 1 pixel, and each broken line shows the size of one half of 1 pixel. The numerical value in each cell is a numerical value that changes depending on the base image signal.

In this exemplary embodiment, the sub-frame image signals for a quad density image (the first through fourth sub-frame image signals) are generated from the base image signal shown in FIG. 8, for example, by the following procedure.

1) The first sub-frame image signal is a signal obtained by sampling a pixel that satisfies the following conditions in the base image signal. When the numerical value, indicating the order of the number of the pixel from column number 0 in the horizontal direction, is divided by 2, the remainder is 0. Further, when the numerical value, indicating the order of the number of the pixel from row number 0 in the vertical direction, is divided by 2, the remainder is 0.

2) The second sub-frame image signal is a signal obtained by sampling a pixel that satisfies the following conditions in the base image signal. When the numerical value, indicating the order of the number of the pixel from column number 0 in the horizontal direction, is divided by 2, the remainder is 1. Further, when the numerical value, indicating the order the pixel from row number 0 in the vertical direction, is divided by 2, the remainder is 0.

3) The third sub-frame image signal is a signal obtained by sampling a pixel that satisfies the following conditions in the base image signal. When the numerical value, indicating the order of the number of the pixel from column number 0 in the horizontal direction, is divided by 2, the remainder is 1. Further, when the numerical value, indicating the order of the number of the pixel from row number 0 in the vertical direction, is divided by 2, the remainder is 1.

4) The fourth sub-frame image signal is a signal obtained by sampling a pixel that satisfies the following conditions in the base image signal. When the numerical value, indicating the order of the number of the pixel from column number 0 in the horizontal direction, is divided by 2, the remainder is 0. Further, when the numerical value, indicating the order of the number of the pixel from row number 0 in the vertical direction, is divided by 2, the remainder is 1.

Thus, the first through fourth sub-frame image signals are generated. The image projected onto the screen, based on an n-th sub-frame image signal, is an n-th sub-frame image (n=1 through 4). Four sub-frame images of the first through fourth sub-frame images form one image frame (a quad density image). However, in this exemplary embodiment, the relative projection positions of the first through fourth sub-frame images on the screen are shifted.

Specifically, as shown in FIG. 11, the second sub-frame image is shifted with respect to the first sub-frame image by ½ pixel in the horizontal direction (+X direction). The third sub-frame image is shifted with respect to the second sub-frame image by ½ pixel in the vertical direction (−Y direction). The fourth sub-frame image is shifted with respect to the third sub-frame image by ½ pixel in the horizontal direction (−X direction). The first sub-frame image is shifted with respect to the fourth sub-frame image by ½ pixel in the vertical direction (+Y direction). By shifting the first through fourth sub-frame images by ½ pixel in the horizontal direction and/or the vertical direction with each other, projector 100 is capable of displaying a quad density image having a resolution (the number of pixels) larger than the number of pixels (the number of micro mirrors) of each of DMDs 240, 250, and 260.

Based on the first through fourth sub-frame image signals, each of DMDs 240, 250, and 260 outputs a sub-frame at a speed four times higher than the frame rate (output frame rate) of the base image signal. Specifically, when the output frame rate is 60 Hz, for example, each of DMDs 240, 250, and 260 outputs a sub-frame at 240 Hz. At this time, actuators 401a through 401d are driven at 60 Hz, which is equal to the output frame rate.

FIG. 12 is a schematic chart showing a state where sub-frame images are shifted so as to form a quad density image in accordance with the first exemplary embodiment. FIG. 12 schematically shows the displacement (VCM displacement) instructed to actuators 401a through 401d and how the first sub-frame image (first SF), second sub-frame image (second SF), third sub-frame image (third SF), and fourth sub-frame image (fourth SF) move when the sub-frame images are projected onto the screen. FIG. 12 simply shows the moving direction of each sub-frame image, and does not show the actual moving amount.

In the example shown in FIG. 12, microcomputer 405 (optical element controller) instructs actuator 401a of displacement A, and instructs actuator 401c of displacement C where displacement A is inverted. The displacement waveform for instructing displacement A is a waveform that changes negatively in display of the first and second sub-frame images and changes positively in display of the third and fourth sub-frame image. The displacement waveform for instructing displacement C is a waveform that changes positively in display of the first and second sub-frame images and changes negatively in display of the third and fourth sub-frame images. Microcomputer 405 (optical element controller) instructs actuator 401b of displacement B, and instructs actuator 401d of displacement D where displacement B is inverted. The displacement waveform for instructing displacement B is a waveform that changes negatively in display of the second and third sub-frame images and changes positively in display of the fourth and first sub-frame images. The displacement waveform for instructing displacement D is a waveform that changes positively in display of the second and third sub-frame images and changes negatively in display of the fourth and first sub-frame images. Thus, the displacement waveforms for instructing actuator 401b and actuator 401d of the displacement are 90° out of phase with the displacement waveforms for instructing actuator 401a and actuator 401c of the displacement. Therefore, plate glass 400 rocks around the B-D axis and A-C axis as rotary axes.

In this exemplary embodiment, the shift amounts of the first through fourth sub-frame images are adjusted so that the respective sub-frame images are projected in the following positions onto the screen. The second sub-frame image is projected in the position displaced by ½ pixel in the horizontal direction with respect to the first sub-frame image. The third sub-frame image is projected in the position displaced by ½ pixel in both horizontal and vertical directions with respect to the first sub-frame image. The fourth sub-frame image is projected in the position displaced by ½ pixel in the vertical direction with respect to the first sub-frame image.

Thus, on the screen, the first sub-frame image (first SF), second sub-frame image (second SF), third sub-frame image (third SF), and fourth sub-frame image (fourth SF) are projected in the positions displaced with each other by ½ pixel, which is caused by displacement of the optical path of the input image light in the horizontal and vertical directions. In this manner, a quad density image is displayed on the screen.

[1-6. Method for Adjusting Pixel Shift Amount]

A description is provided for a method for adjusting the shift amount of a pixel (hereinafter being referred to as a "pixel shift amount", or simply as a "shift amount") projected onto the screen in projector 100 configured as above.

First, the operation of projector 100 in adjustment of the pixel shift amount is outlined.

A user activates a menu screen of projector 100 by operating an operating button provided to projector 100 or a remote controller of projector 100.

Subsequently, the user selects a function of adjusting a pixel shift amount in the menu screen.

This operation starts the function of adjusting the pixel shift amount. Then, microcomputer 405 executes the program generated to operate as an adjusting sub-frame image generator. Thus, microcomputer 405 (adjusting sub-frame image generator) reads out adjusting sub-frame image signals, which are used to generate adjusting patterns and stored in microcomputer 405, and supplies the adjusting sub-frame image signals to DMD driver 411. Then, pattern images for adjusting the pixel shift amount are displayed on the screen. Hereinafter, such a pattern image is referred to as an "adjusting pattern image", and the image based on the adjusting sub-frame image signal as an "adjusting sub-frame image". In this exemplary embodiment, the adjusting pattern images are formed of a "primary adjusting sub-frame image" and a "secondary adjusting sub-frame image". A plurality of "secondary adjusting sub-frame images" may be used.

In this exemplary embodiment, the adjusting sub-frame image generator is implemented by executing software preprogrammed to operate as the adjusting sub-frame image generator, in microcomputer 405. However, the present disclosure is not limited to this configuration. For instance, projector 100 may be configured to include a circuit block configured to operate as the adjusting sub-frame image generator.

The adjusting sub-frame image signals are prestored in a memory in microcomputer 405 and read out in response to the user operation, so that adjusting sub-frame images are generated. That is, the adjusting sub-frame images are generated when the adjusting sub-frame image generator reads out the adjusting sub-frame image signals prestored in the memory. However, projector 100 may be configured so that the adjusting sub-frame image generator generates adjusting sub-frame images when the pixel shift amount is adjusted. The adjusting sub-frame image signals may be prestored in a memory provided separately from the memory in microcomputer 405.

When the user changes the displacement amounts to be instructed to actuators 401a through 401d from shift amount adjuster 413 via microcomputer 405 (optical element controller), by operating shift amount operating part 412 (e.g. an operating key provided to projector 100 or a remote controller of projector 100), appearance of the adjusting pattern images projected onto the screen changes. The user sets the displacement amounts to be instructed to actuators 401a through 401d so that the appearance of the adjusting pattern images is in an appropriate state. In projector 100, the pixel shift amount is adjusted by this procedure.

Figure 13:
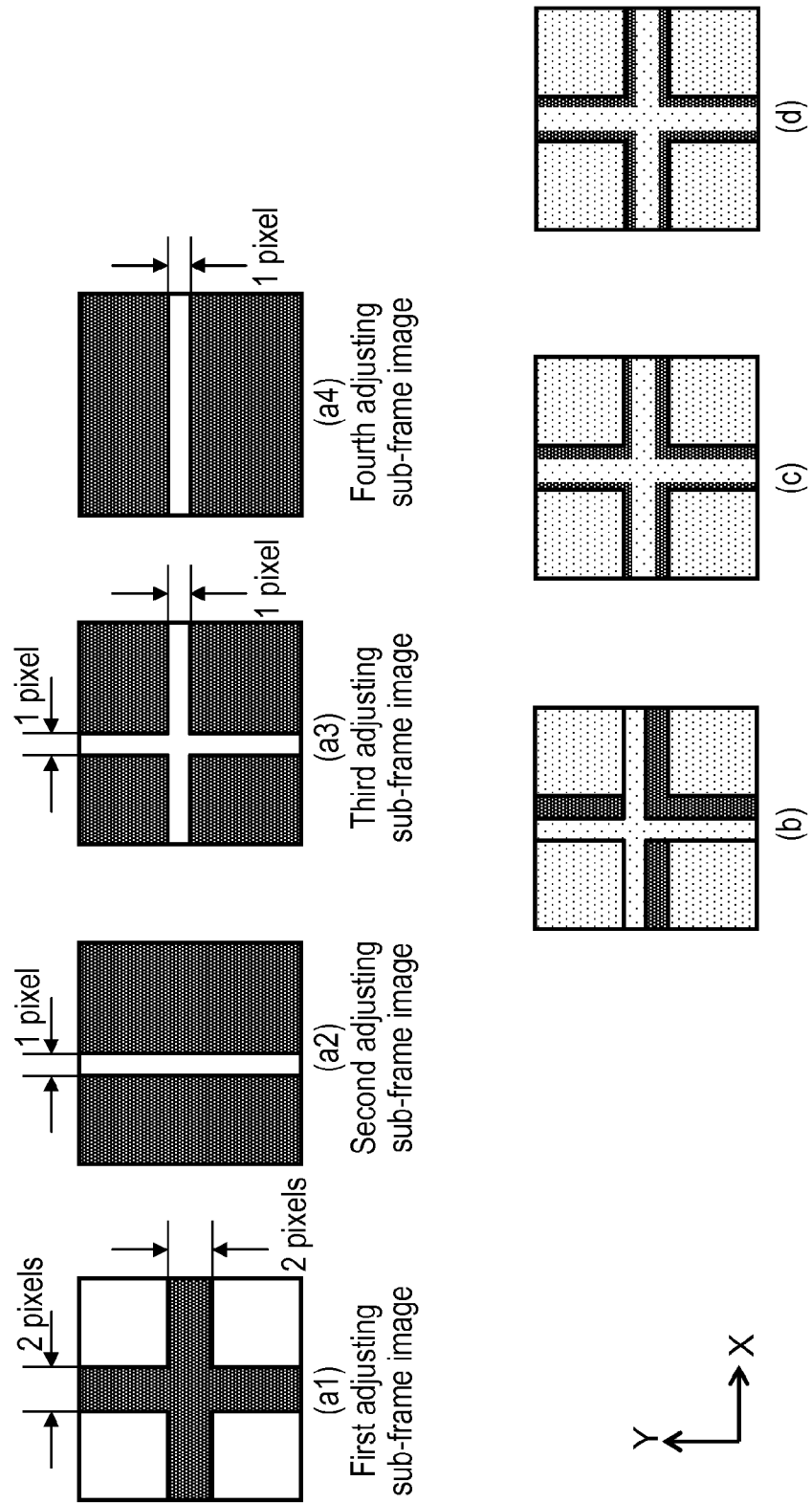
FIG. 13 is a chart schematically showing adjusting sub-frame images in accordance with the first exemplary embodiment.

Next, a description is provided for the adjusting pattern images for adjusting the pixel shift amount and the appearance of the adjusting pattern images in adjustment of the pixel shift amount, with reference to FIG. 13. Here, a description is provided for an example of adjusting the pixel shift amount of each of the first through fourth sub-frame images when a quad density image is projected onto the screen.

FIG. 13 is a chart schematically showing adjusting sub-frame images in accordance with the first exemplary embodiment. FIG. 13 schematically shows diagrams in each of which part of a display image is enlarged when a adjusting sub-frame image for adjusting a pixel shift amount is projected onto the screen. Diagrams (a1) through (a4) show the first through fourth adjusting sub-frame images, respectively, displayed individually. Each of diagrams (b) through (d) shows the display image where the first through fourth adjusting sub-frame images overlap each other. In the chart of FIG. 13 and thereafter, the horizontal direction is defined as the X direction and the vertical direction is defined as the Y direction.

In the example shown in FIG. 13, the first adjusting sub-frame image shown in diagram (a1) of FIG. 13 is an example of the "primary adjusting sub-frame image", and each of the second through fourth adjusting sub-frame images shown in diagrams (a2) through (a4), respectively, of FIG. 13 is an example of the "secondary adjusting sub-frame image".

Herein, the second adjusting sub-frame image shifts in the +X direction with respect to the first adjusting sub-frame image. The third adjusting sub-frame image shifts in the −Y direction with respect to the second adjusting sub-frame image. The fourth adjusting sub-frame image shifts in the −X direction with respect to the third adjusting sub-frame image. The first adjusting sub-frame image shifts in the +Y direction with respect to the fourth adjusting sub-frame image.

In this exemplary embodiment, the first, second, third, and fourth sub-frame images forming one quad density image is displayed on the screen as follows. The first, second, third, and fourth sub-frame images shift in turn with respect to the previous sub-frame image by ½ pixel in the +Y direction, ½ pixel in the +X direction, ½ pixel in the −Y direction, and ½ pixel in the −X direction, respectively. In the next frame, respective sub-frame images return to the original positions thereof. FIG. 13 shows the adjusting pattern images when the shift amount of each sub-frame image is set in this manner.

FIG. 13 shows an example where a first color and a fourth color are black, a second color and a third color are white, N=2, M=1, and α=1 (i.e. N=M+1).

In the example shown in FIG. 13, when the vertical line in the first adjusting sub-frame image is a first line, a second line is the vertical line in the second adjusting sub-frame image or the third adjusting sub-frame image. When the horizontal line in the first adjusting sub-frame image is a first line, a second line is the horizontal line in the third adjusting sub-frame image or the fourth adjusting sub-frame image. When combination of the horizontal line and the vertical line in the first adjusting sub-frame image is a first line, a second line is combination of the horizontal line and the vertical line in the third adjusting sub-frame image.

The first through fourth colors are not limited to the above colors and may be other colors. The first through fourth colors only need to be set to colors that can be easily distinguished from each other. N and M are not limited to values of N=2 and M=1, and may be other numerical values that satisfy a relation of N=M+α (where when α=1, N=M+1).

As shown in diagram (a1) of FIG. 13, the first adjusting sub-frame image has a design in which a pattern of combination of a horizontal line and a vertical line each having the first color (black) and a width of N pixels (2 pixels) is displayed on a solid background image having the second color (white).

In this exemplary embodiment, the horizontal line is a line extending in the direction parallel to one side (e.g. a long side) of an image displayed on the screen, and the vertical line is a line extending in the direction perpendicular to the side. That is, it does not mean that the horizontal line is parallel to the ground and the vertical line is perpendicular to the ground.

As shown in diagram (a2) of FIG. 13, the second adjusting sub-frame image has a design in which a vertical line having the third color (white) and a width of an M pixel (1 pixel) is displayed on a solid background image having the fourth color (black).

As shown in diagram (a3) of FIG. 13, the third adjusting sub-frame image has a design in which a pattern of combination of a vertical line and a horizontal line each having the third color (white) and a width of an M pixel (1 pixel) is displayed on a solid background image having the fourth color (black).

As shown in diagram (a4) of FIG. 13, the fourth adjusting sub-frame image has a design in which a horizontal line having the third color (white) and a width of an M pixel (1 pixel) is displayed on a solid background image having the fourth color (black).

The second adjusting sub-frame image is set to a design having the vertical line so as to allow adjustment of a shift amount of ½ pixel in the horizontal direction with respect to the first adjusting sub-frame image. The third adjusting sub-frame image is set to a design having combination of the horizontal line and the vertical line so as to allow a shift adjustment of ½ pixel in both horizontal and vertical directions with respect to the first adjusting sub-frame image. The fourth adjusting sub-frame image is set to a design having the horizontal line so as to allow a shift adjustment of ½ pixel in the vertical direction with respect to the first adjusting sub-frame image. However, this exemplary embodiment is not limited to this configuration. Preferably, the design of each sub-frame image is set based on the relative shift direction with respect to the "primary adjusting sub-frame image".

A description is provided for the display position of the line in each of the first, second, third, and fourth adjusting sub-frame images.

Diagram (b) of FIG. 13 is a diagram showing a state (initial state) where the first, second, third, and fourth adjusting sub-frame images are displayed so as to be overlapped each other without adjustment of a pixel shift amount.

In the example shown in FIG. 13, the line in each of the second through fourth adjusting sub-frame images is set to have a width 1 pixel smaller than the first line in the first adjusting sub-frame image. The designs of the first adjusting sub-frame image and the second adjusting sub-frame image are set as follows. As shown in diagram (b) of FIG. 13, in the initial state, the white vertical line having a width of 1 pixel in the second adjusting sub-frame image is displayed in the position overlapping the left half region of the black vertical line having a width of 2 pixels in the first adjusting sub-frame image.

The designs of the first adjusting sub-frame image and the third adjusting sub-frame image are set as follows. In the initial state, the white vertical line having a width of 1 pixel in the third adjusting sub-frame image is displayed in the position overlapping the left half region of the black vertical line having a width of 2 pixels in the first adjusting sub-frame image. Further, the white horizontal line having a width of 1 pixel in the third adjusting sub-frame image is displayed in the position overlapping the upper half region of the black horizontal line having a width of 2 pixels in the first adjusting sub-frame image.

The designs of the first adjusting sub-frame image and the fourth adjusting sub-frame image are set as follows. In the initial state, the white horizontal line having a width of 1 pixel in the fourth adjusting sub-frame image is displayed in the position overlapping the upper half region of the black horizontal line having a width of 2 pixels in the first adjusting sub-frame image.

Thus, in the initial state, on the screen, a black vertical line having a width of 1 pixel is displayed on the right side of a white vertical line having a width of 1 pixel and a black horizontal line having a width of 1 pixel is displayed on the lower side of a white horizontal line having a width of 1 pixel.

In this exemplary embodiment, the first, second, third, and fourth adjusting sub-frame images are set so that each adjusting sub-frame image satisfies the above conditions.

Each of diagrams (b) through (d) in FIG. 13 shows the state where four of the first through fourth adjusting sub-frame images are overlapped each other. Thus, the area where the white region in one of the adjusting sub-frame images overlaps the black region in another of the adjusting sub-frame images is shown by gray.

When the user operates shift amount operating part 412 so as to increase the pixel shift amount, the displacement amount instructed to actuators 401a through 401d from shift amount adjuster 413 via microcomputer 405 (optical element controller) increases. This increases the pixel shift amount. Thus, the appearance of the display image on the screen changes from the state shown in diagram (b) to the state shown in diagram (c) in FIG. 13, for example.

Specifically, when the user operates shift amount operating part 412 so as to increase the pixel shift amount, the displacement amount is instructed from shift amount adjuster 413 to microcomputer 405 (optical element controller). That is, the displacement amount in display of the first through fourth sub-frame images is instructed from shift amount adjuster 413 to microcomputer 405 (optical element controller) in the following manner. The vertical line in each of the second and third adjusting sub-frame images relatively shifts in the +X direction with respect to the vertical line in the first adjusting sub-frame image. The horizontal line in each of the third and fourth adjusting sub-frame images relatively shifts in the −Y direction with respect to the horizontal line in the first adjusting sub-frame image.

When the user operates shift amount operating part 412 so as to further increase the pixel shift amount, the displacement amount instructed to actuators 401a through 401d from shift amount adjuster 413 via microcomputer 405 (optical element controller) further increases. This further increases the shift amount of each sub-frame image. Then, the relative shift amount of each of the second and third adjusting sub-frame images with respect to the first adjusting sub-frame image becomes ½ pixel in the +X direction. The relative shift amount of each of the third and fourth adjusting sub-frame images with respect to the first adjusting sub-frame image becomes ½ pixel in the −Y direction. This state is shown in diagram (d) of FIG. 13.

At this time, the white vertical line in each of the second and third adjusting sub-frame images is displayed in the center of the black vertical line in the first adjusting sub-frame image, as shown in diagram (d) of FIG. 13. The white horizontal line in each of the third and fourth adjusting sub-frame images is displayed in the center of the black horizontal line in the first adjusting sub-frame image. Thus, on the screen, a black vertical line having a width of ½ pixel appears on both right and left sides of a white vertical line, and a black horizontal line having a width of ½ pixel appears on both upper and lower sides of a white horizontal line.

The state shown in diagram (d) of FIG. 13 is the state where the following adjustment (adjustment of the pixel shift amount) has been completed. That is, the display position of the second sub-frame image with respect to the first sub-frame image has been relatively shifted by ½ pixel in the horizontal (+X) direction. The display position of the third sub-frame image with respect to the first sub-frame image has been relatively shifted by ½ pixel in both horizontal (+X) and vertical (−Y) directions. The display position of the fourth sub-frame image with respect to the first sub-frame image has been relatively shifted by ½ pixel in the vertical (−Y) direction.

In the state where adjustment of the shift amount is completed, the vertical and horizontal white lines are displayed in the center of the vertical and horizontal black lines. Thus, the user only needs to adjust the shift amount so as to increase the vertical and horizontal symmetry of the adjusting pattern images displayed on the screen. That is, the user only needs to continue adjustment of the shift amount until the adjusting pattern images displayed on the screen become the state shown in diagram (d) of FIG. 13, and to complete the adjustment of the shift amount when the adjusting pattern images become the state shown in diagram (d). Thus, in projector 100 of this exemplary embodiment, the user can perform accurate adjustment of the pixel shift amount even visually.

In the example shown in FIG. 13, projector 100 can be configured so that the third adjusting sub-frame image is a solid black image without white lines and projector 100 adjusts the pixel shift amount only with the first, second, and fourth adjusting sub-frame images, for example. In this case, each of the second and fourth adjusting sub-frame images is an example of the "secondary adjusting sub-frame image".

Alternatively, projector 100 can be configured so that each of the second and fourth adjusting sub-frame images is a solid black image without a white line and projector 100 adjusts the pixel shift amount only with the first and third adjusting sub-frame images. In this case, the third adjusting sub-frame image is an example of the "secondary adjusting sub-frame image".

When a double density image is projected onto the screen, the pixel shift amount can be adjusted using the first adjusting sub-frame image shown in FIG. 13 as an example of the "primary adjusting sub-frame image" and the third adjusting sub-frame image shown in FIG. 13 as an example of the "secondary adjusting sub-frame image".

In the example shown in FIG. 13, the first through fourth adjusting sub-frame images do not necessarily overlap each other in the same position. For instance, the region where the line in the first adjusting sub-frame image overlaps the line in the second adjusting sub-frame image, the region where the lines in the first adjusting sub-frame image overlap the lines in the third adjusting sub-frame image, and the region where the line in the first adjusting sub-frame image overlaps the line in the fourth adjusting sub-frame image may be separated from each other. The first adjusting sub-frame image may have different designs in respective regions, depending on the designs of other adjusting sub-frame images overlapping the first adjusting sub-frame image. Specifically, in the first adjusting sub-frame image, the region overlapping the line in the second adjusting sub-frame image may have only the black vertical line having a width of 2 pixels, and the region overlapping the line in the fourth adjusting sub-frame image may have only the black horizontal line having a width of 2 pixels.

[1-7-1. First Variation of First Exemplary Embodiment]

FIG. 13 shows an example where the first color and the fourth color are black, the second color and the third color are white, N=2, M=1, and α=1. However, this exemplary embodiment is not limited to this configuration.

Figure 14:
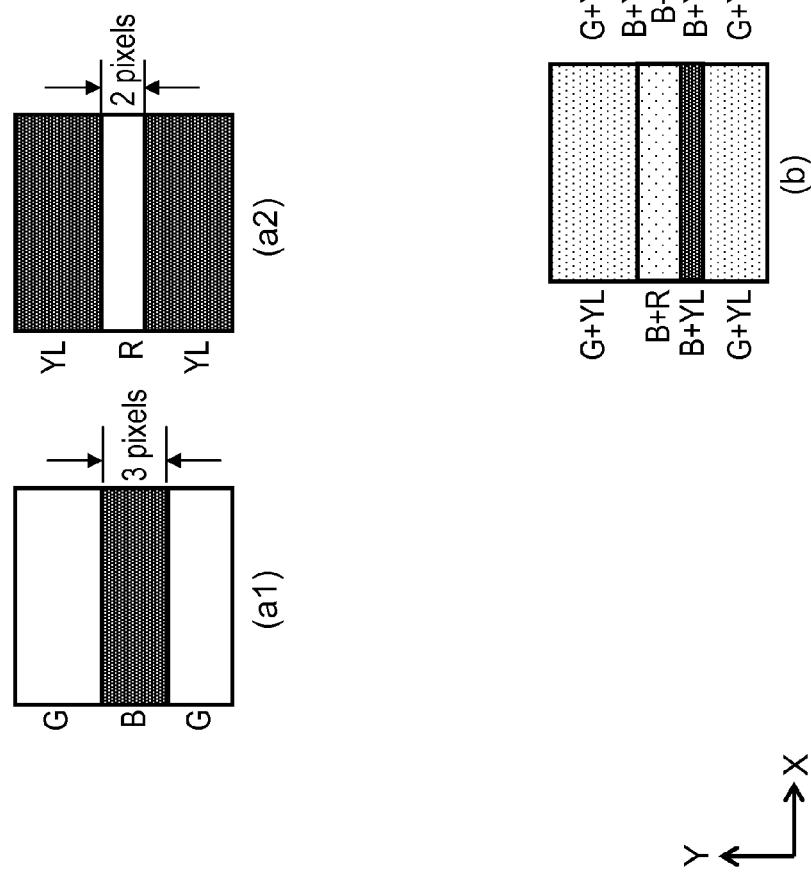
FIG. 14 is a chart showing a first variation of the first exemplary embodiment.

FIG. 14 is a chart showing a first variation of the first exemplary embodiment. FIG. 14 schematically shows diagrams in each of which part of a display image is enlarged when a sub-frame image for adjusting the pixel shift amount is projected onto the screen. Diagram (a1) shows part of a "primary adjusting sub-frame image" and diagram (a2) shows part of a "secondary adjusting sub-frame image". Each of diagrams (b) through (d) shows the display image where diagrams (a1) and (a2) overlap each other.

FIG. 14 shows an example where the first color is blue (B), the second color is green (G), the third color is red (R), the fourth color is yellow (YL), N=3, M=2, and α=1 (that is, the relation of N=M+1 is satisfied). In the example shown in FIG. 14, a first line is a horizontal line in the "primary adjusting sub-frame image" shown in diagram (a1), and a second line is a horizontal line in the "secondary adjusting sub-frame image" shown in diagram (a2). However, the "primary adjusting sub-frame image" shown in diagram (a1) may include a vertical line as the first line, and the "secondary adjusting sub-frame image" shown in diagram (a2) may include a vertical line as the second line. Alternatively, as the second line, another adjusting sub-frame image having a vertical line may be generated.

The first through fourth colors only need to be set to colors that can be easily distinguished from each other, and are not limited to the example shown in FIG. 14. N and M are not limited to values of N=3, M=2, and α=1, and may be other numerical values that satisfy the relation of N=M+α (where when α=1, N=M+1).

In the example shown in FIG. 14, in adjustment of the pixel shift amount, the "secondary adjusting sub-frame image" shown in diagram (a2) is relatively shifted in the −Y direction with respect to the "primary adjusting sub-frame image" shown in diagram (a1).

In the example shown in FIG. 14, as shown in diagram (a1), the "primary adjusting sub-frame image" has a design in which the first line (e.g. a horizontal line) having the first color (blue) and a width of N pixels (3 pixels) is displayed on a solid background image having the second color (green). As shown in diagram (a2), the "secondary adjusting sub-frame image" has a design in which the second line (e.g. a horizontal line) having the third color (red) and a width of M pixels (2 pixels) is displayed on a solid background image having the fourth color (yellow).

Diagram (b) of FIG. 14 is a diagram showing the state (initial state) where the "primary adjusting sub-frame image" and the "secondary adjusting sub-frame image" are displayed so as to be overlapped each other without adjustment of a pixel shift amount.

In the example shown in FIG. 14, the second line in the "secondary adjusting sub-frame image" is set to have a width 1 pixel smaller than the first line in the "primary adjusting sub-frame image". Further, the design of each adjusting sub-frame image is set as follows. As shown in diagram (b) of FIG. 14, in the initial state, the red horizontal line having a width of 2 pixels in the "secondary adjusting sub-frame image" is displayed in the upper position overlapping the 2-pixel wide region of the blue horizontal line having a width of 3 pixels in the "primary adjusting sub-frame image".

Each of diagrams (b) through (d) in FIG. 14 shows the state where two of the primary and secondary adjusting sub-frame images are overlapped each other. The region where blue overlaps red (B+R) becomes magenta, the region where green overlaps yellow (G+YL) becomes yellowish green, and the region where blue overlaps yellow (B+YL) becomes white.

Thus, in the initial state, on the screen, a white (B+YL) horizontal line having a width of 1 pixel is displayed on the lower side of a magenta (B+R) horizontal line having a width of 2 pixels.

When the user operates shift amount operating part 412 so as to instruct actuators 401a through 401d of the displacement, the display position of the "secondary adjusting sub-frame image" with respect to the "primary adjusting sub-frame image" is relatively shifted in the −Y direction. Thus, the appearance of the display image on the screen changes from the state shown in diagram (b) to the state shown in diagram (c) in FIG. 14, for example.

When the user operates shift amount operating part 412 so as to further increase the pixel shift amount, the displacement amount instructed to actuators 401a through 401d further increases. Then, the relative shift amount of the "secondary adjusting sub-frame image" with respect to the "primary adjusting sub-frame image" becomes ½ pixel in the −Y direction. The state is shown in diagram (d) of FIG. 14.

At this time, as shown in diagram (d) of FIG. 14, the red horizontal line in the "secondary adjusting sub-frame image" is displayed in the center of the blue horizontal line in the "primary adjusting sub-frame image". Thus, on the screen, a white (B+YL) horizontal line having a width of ½ pixel appears on both upper and lower sides of a magenta (B+R) horizontal line.

The state shown in diagram (d) of FIG. 14 is the state where the following adjustment (adjustment of the pixel shift amount) has been completed. That is, the display position of the "secondary sub-frame image" with respect to the "primary sub-frame image" has been relatively shifted by ½ pixel in the vertical (−Y) direction.

In the state where adjustment of the shift amount is completed, the magenta horizontal line is displayed in the center of the white horizontal line. Thus, the user only needs to adjust the shift amount so as to increase the vertical symmetry of the adjusting pattern images displayed on the screen. This allows the user to perform accurate adjustment of the pixel shift amount even visually.

[1-7-2. Second and Third Variations of First Exemplary Embodiment]

Each of FIG. 13 and FIG. 14 shows a line extending horizontally or vertically, as an example of a second line. However, the second line is not limited to the design shown in FIG. 13 or FIG. 14.

Figure 15:
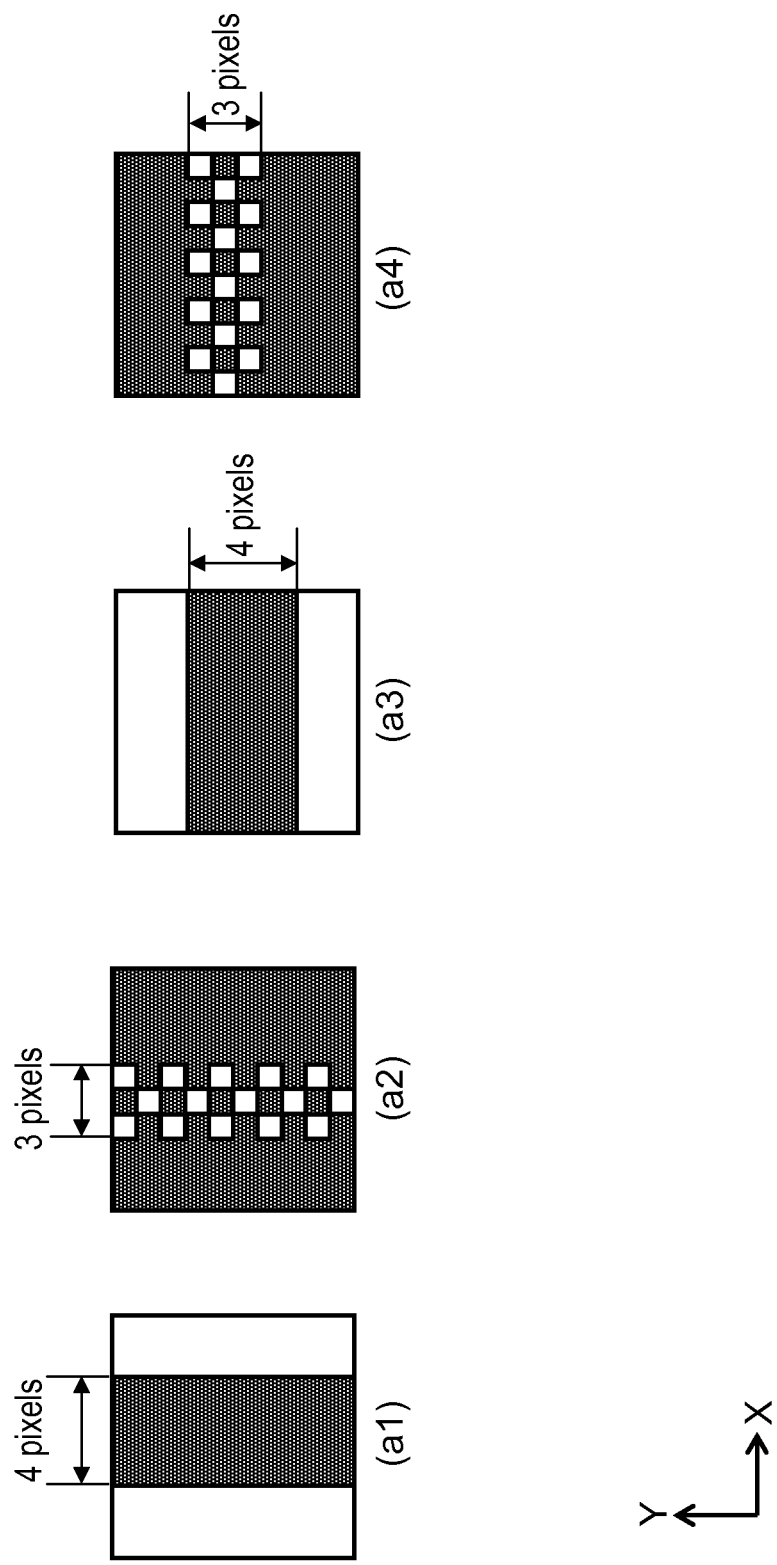
FIG. 15 is a chart showing a second variation of the first exemplary embodiment.
Figure 16:
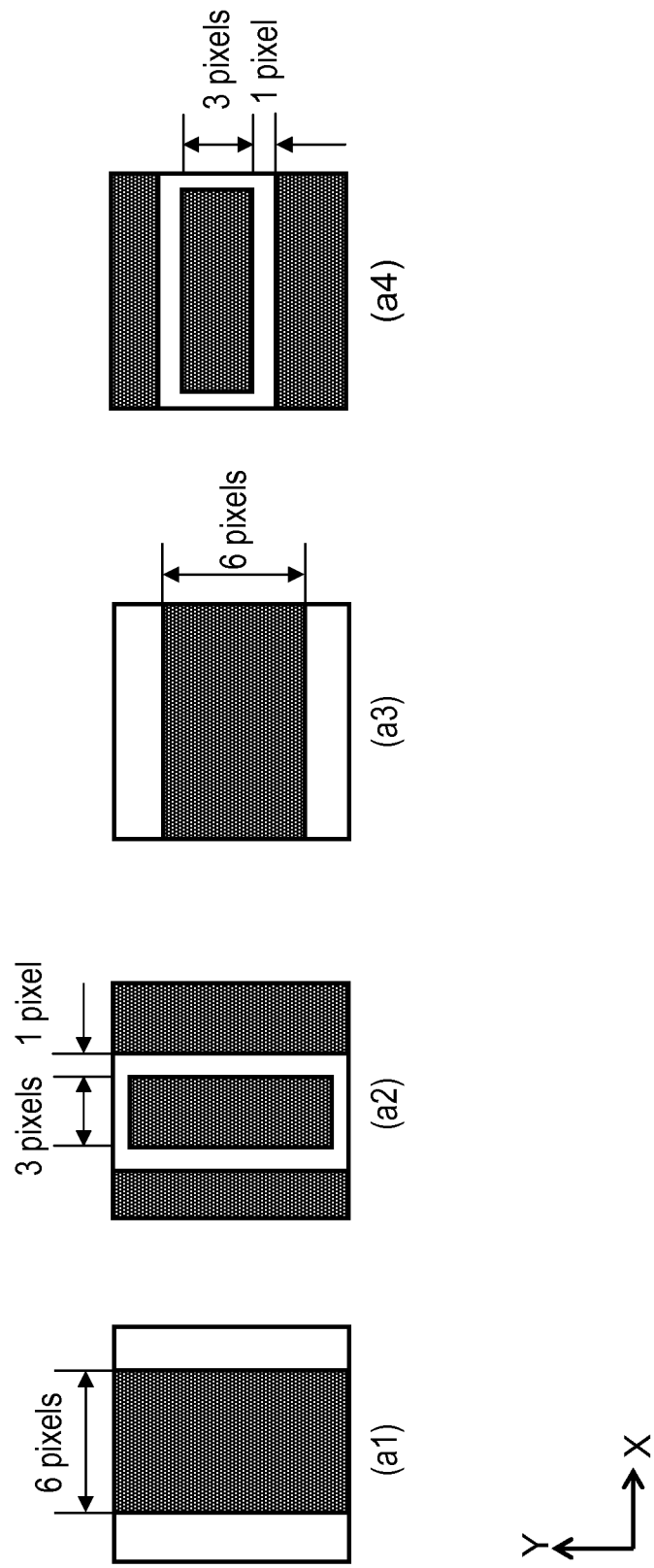
FIG. 16 is a chart showing a third variation of the first exemplary embodiment.

FIG. 15 is a chart showing the second variation of the first exemplary embodiment. FIG. 16 is a chart showing the third variation of the first exemplary embodiment. In each of FIG. 15 and FIG. 16, diagram (a1) shows a first line extending in the vertical direction, diagram (a3) shows a first line extending in the horizontal direction, diagram (a2) shows a second line extending in the vertical direction, and diagram (a4) shows a second line extending in the horizontal direction. In the diagrams, the lines are enlarged.

FIG. 15 shows an example where a second line has a design of a checkered pattern. FIG. 15 shows an example where a first color and a fourth color are black, a second color and a third color are white, N=4, M=3, and α=1 (that is, the relation of N=M+1 is satisfied).

For instance, as shown in diagrams (a1) and (a3) of FIG. 15, a "primary adjusting sub-frame image" may have a design in which the first line having the first color (black) and a width of N pixels (4 pixels) (a vertical line or horizontal a line) is displayed on a solid background image having the second color (white). As shown in diagrams (a2) and (a4) of FIG. 15, a "secondary adjusting sub-frame image" may have a design in which the second line having the third color (white) and a width of M pixels (3 pixels) (a vertical or horizontal line with a checkered pattern) is displayed on a solid background image having the fourth color (black).

In the checkered pattern of the second line shown in FIG. 15, each dot is set to 1 pixel, but each dot may be equal to or greater than 2 pixels.

FIG. 16 shows an example of a design where a second line has a frame on every side. FIG. 16 shows an example where a first color and a fourth color are black, a second color and a third color are white, N=6, M=5, and α=1 (that is, the relation of N=M+1 is satisfied).

For instance, as shown in diagrams (a1) and (a3) of FIG. 16, a "primary adjusting sub-frame image" may have a design in which the first line having the first color (black) and a width of N pixels (6 pixels) (a vertical line or a horizontal line) is displayed on a solid background image having the second color (white). As shown in diagrams (a2) and (a4) of FIG. 16, a "secondary adjusting sub-frame image" may have a design in which the second line having the third color (white) and a width of M pixels (5 pixels) (a vertical line or a horizontal line) is displayed on a solid background image having the fourth color (black). The second line has a design in which a frame having a width of 1 pixel and the third color (white) surrounds the region having the fourth color (black) and a width of M−2 pixels (3 pixels).

The width of the frame in the second line shown in FIG. 16 is not limited to 1 pixel, and may be equal to or greater than 2 pixels.

In this manner, the adjusting pattern images may have the designs shown in FIG. 15 and FIG. 16.

[1-7-3. Fourth Variation of First Exemplary Embodiment]

Figure 17:
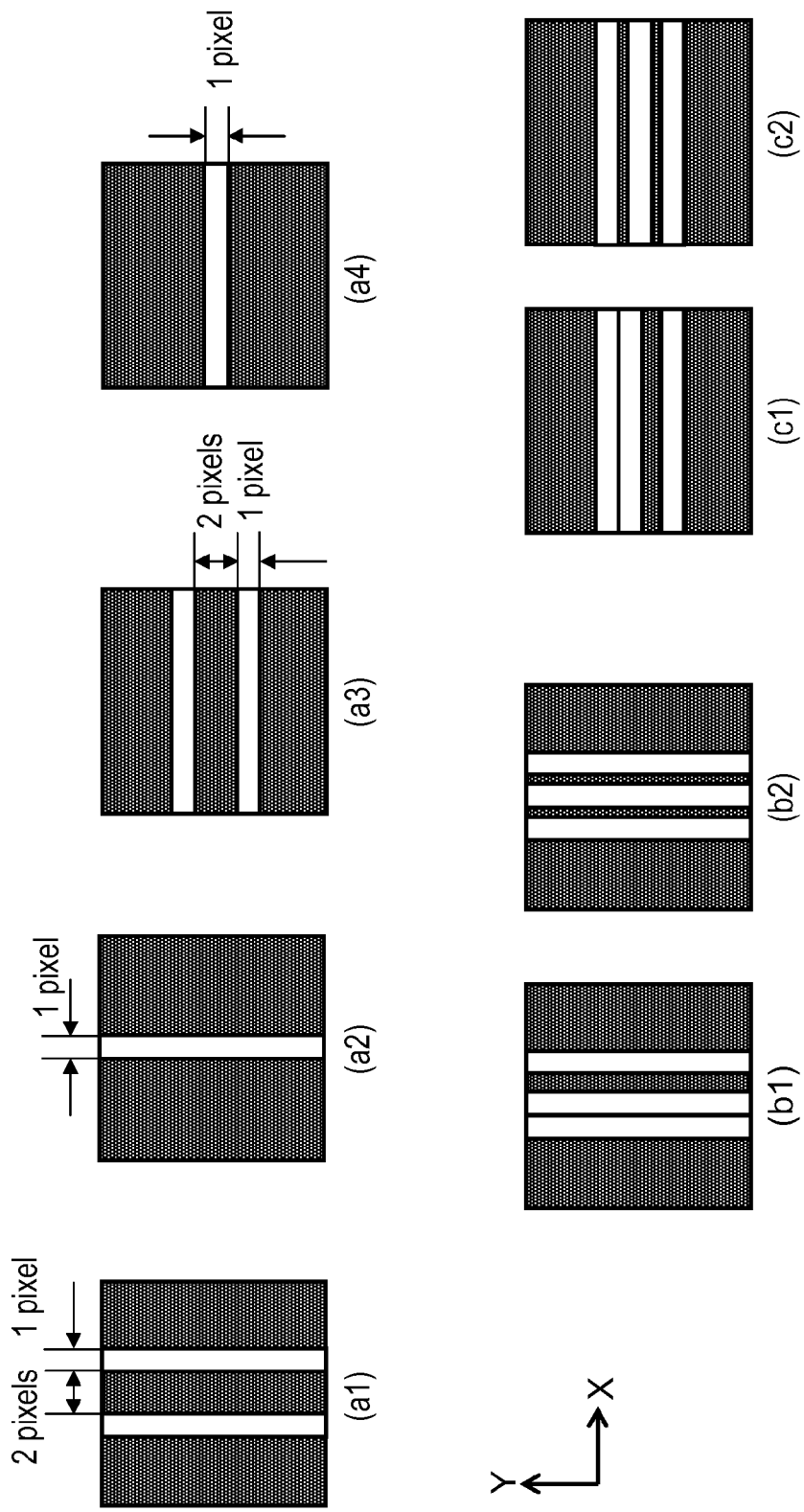
FIG. 17 is a chart showing a fourth variation of the first exemplary embodiment.

FIG. 17 is a chart showing the fourth variation of the first exemplary embodiment. In FIG. 17, diagram (a1) shows a first line extending in the vertical direction, diagram (a3) shows a first line extending in the horizontal direction, diagram (a2) shows a second line extending in the vertical direction, and diagram (a4) shows a second line extending in the horizontal direction. In the diagrams, the lines are enlarged. Each of diagrams (b1), (b2), (c1), and (c2) shows a partially enlarged image (an image displayed on the screen) where a "primary adjusting sub-frame image" and a "secondary adjusting sub-frame image" overlap each other.

FIG. 17 shows an example of a design where a border having a width of 1 pixel is disposed on both sides of the first line. FIG. 17 shows an example where a first color and a fourth color are black, a second color and a third color are green, N=2, M=1, and α=1 (that is, the relation of N=M+1 is satisfied).

In the example shown in diagrams (a1) and (a3) of FIG. 17, the first line (a vertical line or a horizontal line) of the "primary adjusting sub-frame image" is set to have the first color (black) and a width of N pixels (2 pixels). A border having a width of 1 pixel and the second color (green) is disposed on both sides of the first line. The region other than these borders is set to the first color (black), which is the same as that of the first line. In the example shown in FIG. 17, these borders are regarded as the background of the first line. Thus, in the example shown in FIG. 17, the color of the background image in the "primary adjusting sub-frame image" is the second color (green).

As shown in diagrams (a2) and (a4) of FIG. 17, the "secondary adjusting sub-frame image" is set to a design in which the second line having the third color (green) and a width of an M pixel (1 pixel) (a vertical line or a horizontal line) is displayed on a solid background image having the fourth color (black).

Before adjustment of the pixel shift amount (in the initial state), the following images are displayed on the screen. For instance, the image shown in diagram (b1) of FIG. 17 is displayed in the region displaying vertical lines, and the image shown in diagram (c1) of FIG. 17 is displayed in the region displaying horizontal lines. That is, in the initial state, a black vertical line having a width of 1 pixel is displayed on the right side of a green vertical line having a width of 1 pixel, and a black horizontal line having a width of 1 pixel is displayed on the lower side of a green horizontal line having a width of 1 pixel.

After adjustment of the pixel shift amount has been completed, the following images are displayed on the screen. For instance, the image shown in diagram (b2) of FIG. 17 is displayed in the region displaying vertical lines, and the image shown in diagram (c2) of FIG. 17 is displayed in the region displaying horizontal lines. That is, after adjustment of the pixel shift amount has been completed, a black vertical line having a width of ½ pixel appears on both right and left sides of a green vertical line having a width of 1 pixel, and a black horizontal line having a width of ½ pixel appears on both upper and lower sides of a green horizontal line having a width of 1 pixel.

In this manner, the adjusting pattern images may have the designs shown in FIG. 17.

[1-7-4. Fifth Variation of First Exemplary Embodiment]

Each of FIG. 13 through FIG. 17 shows an example where the first line and the second line extend in the horizontal direction or the vertical direction. However, extending directions of the first line and the second line are not limited to the horizontal direction or the vertical direction.

Figure 18:
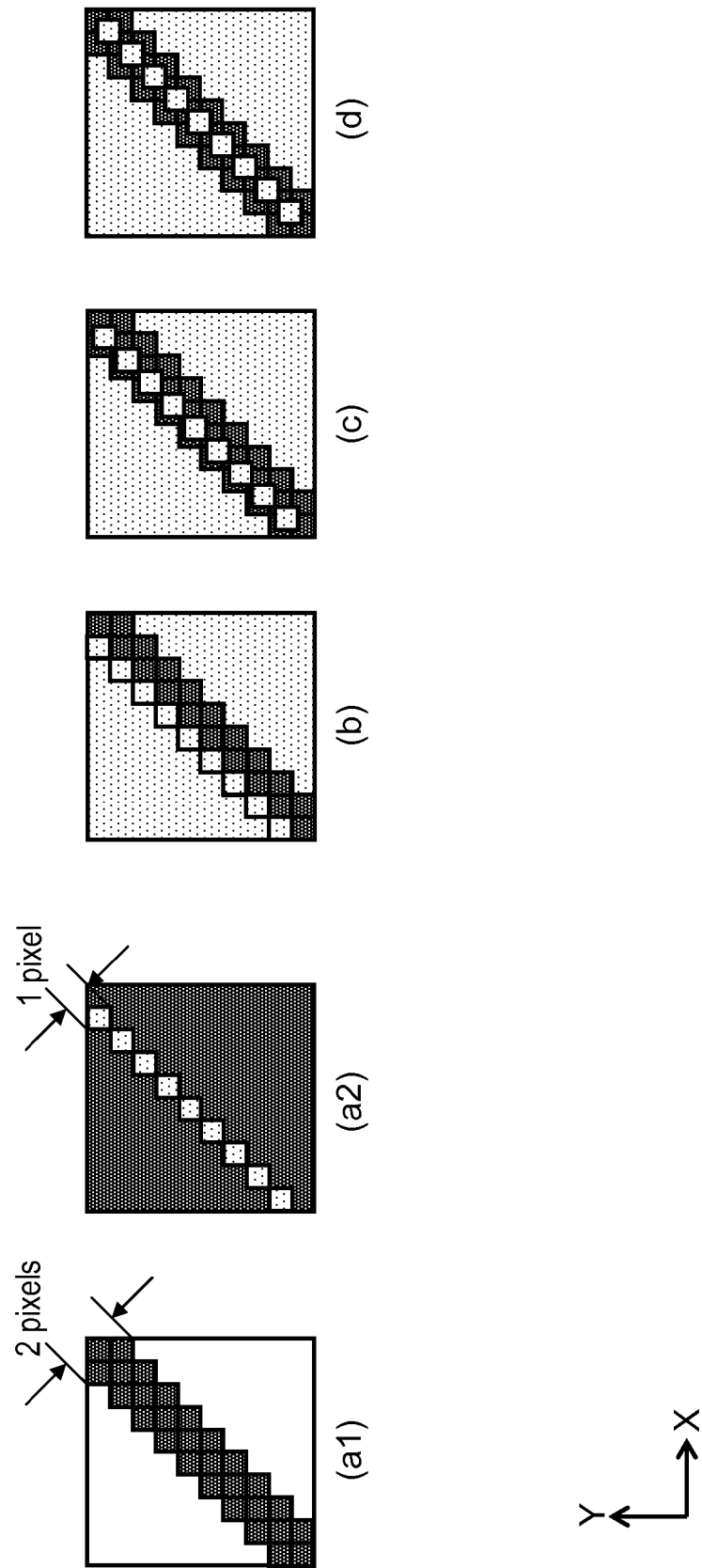
FIG. 18 is a chart showing a fifth variation of the first exemplary embodiment.

FIG. 18 is a chart showing the fifth variation of the first exemplary embodiment. In FIG. 18, diagram (a1) shows a "primary adjusting sub-frame image", diagram (a2) shows a "secondary adjusting sub-frame image" and each of diagrams (b) through (d) shows an image where the adjusting sub-frame images overlap each other. In the diagrams, the images are enlarged.

In the example shown in FIG. 18, each of a first line and a second line is set to a line extending diagonally (a diagonal line) with respect to one side (e.g. a long side) of an image to be displayed on the screen. The angle of this diagonal line is set to $\tan\theta = \Delta Y/\Delta X = 1$ pixel/1 pixel, for example, but may be set to another angle.

FIG. 18 shows an example where a first color and a fourth color are black, a second color and a third color are white, N=2, M=1, and α=1 (that is, the relation of N=M+1 is satisfied).

In the example shown in FIG. 18, the "secondary adjusting sub-frame image" is relatively shifted in the +X−Y diagonal direction with respect to the "primary adjusting sub-frame image".

As shown in diagram (a1) of FIG. 18, the "primary adjusting sub-frame image" has a design in which the first line (diagonal line) having the first color (black) and a width of N pixels (2 pixels) is displayed on a solid background image having the second color (white). The "secondary adjusting sub-frame image" has a design in which the second line (diagonal line) having the third color (white) and a width of an M pixel (1 pixel) is displayed on a solid background image having the fourth color (black).

A description is provided for the display position of the line in each of the "primary adjusting sub-frame image" and the "secondary adjusting sub-frame image".

Diagram (b) of FIG. 18 is a diagram showing a state (initial state) where the "primary adjusting sub-frame image" and the "secondary adjusting sub-frame image" are displayed so as to be overlapped each other without adjustment of a pixel shift amount.

In the example shown in FIG. 18, the second line in the "secondary adjusting sub-frame image" is set to have a width 1 pixel smaller than the first line in the "primary adjusting sub-frame image". Further, the designs of the "primary adjusting sub-frame image" and the "secondary adjusting sub-frame image" are set as follows. As shown in diagram (b) of FIG. 18, in the initial state, the white diagonal line having a width of 1 pixel in the "secondary adjusting sub-frame image" is displayed in the position overlapping the 1-pixel wide upper left region of the black diagonal line having a width of 2 pixels in the "primary adjusting sub-frame image".

When the user operates shift amount operating part 412 so as to increase the pixel shift amount, the displacement amount instructed to actuators 401*a* through 401*d* from shift amount adjuster 413 via microcomputer 405 (optical element controller) increases. Thus, each pixel in the "secondary adjusting sub-frame image" relatively shifts in the +X−Y diagonal direction with respect to the "primary adjusting sub-frame image". Thus, the appearance of the display image on the screen changes from the state shown in diagram (b) to the state shown in diagram (c) in FIG. 18, for example.

When the user operates shift amount operating part 412 so as to further increase the pixel shift amount, the displacement amount instructed to actuators 401*a* through 401*d* further increases. Thus, the relative shift amount of the "secondary adjusting sub-frame image" with respect to the "primary adjusting sub-frame image" becomes ½ pixel in both +X direction and −Y direction. The state is shown in diagram (d) of FIG. 18.

At this time, as shown in diagram (d) of FIG. 18, the white diagonal line in the "secondary adjusting sub-frame image" is displayed in the center of the black diagonal line in the "primary adjusting sub-frame image". Thus, a black diagonal line having a width of ½ pixel appears on both sides of the white diagonal line on the screen.

The state shown in diagram (d) of FIG. 18 is the state where the following adjustment (adjustment of the pixel shift amount) has been completed. That is, the display position of the "secondary sub-frame image" with respect to the "primary sub-frame image" has been relatively shifted by ½ pixel in both horizontal (+X) direction and vertical (−Y) direction.

In the state where adjustment of the shift amount is completed, the white diagonal line is displayed in the center of the black diagonal line. Thus, the user only needs to adjust the shift amount so as to increase the diagonal symmetry of the adjusting pattern images displayed on the screen. This allows the user to perform accurate adjustment of the pixel shift amount even visually.

[1.8. Advantageous Effects]

As described above, in this exemplary embodiment, projector 100 as the projection type image display apparatus is configured to display an image formed of an image frame on a projection surface by projecting a plurality of sub-frame images forming the image frame onto the projection surface. The projector is also configured to be capable of optically shifting projection positions of the sub-frame images when the sub-frame images are projected onto the projection surface. Further, projector 100 as the projection type image display apparatus includes an adjusting sub-frame image generator and shift amount adjuster 413. For instance, the adjusting sub-frame image generator may be implemented by executing a program in microcomputer 405. The adjusting sub-frame image generator is configured to generate a "primary adjusting sub-frame image" and a "secondary adjusting sub-frame image". The "primary adjusting sub-frame image" has a design in which a first line having a first color and a width of N pixels (N being a natural number) is displayed on a background image having a second color. The "secondary adjusting sub-frame image" has a design in which a second line having a third color and a width of an M pixel, where the width is set to N=M+α (M being an integer equal to or greater than 1, α=1), is displayed on a background image having a fourth color. Shift amount adjuster 413 is configured to adjust a shift amount when the display position of the "primary adjusting sub-frame image" on the projection surface and the display position of the "secondary adjusting sub-frame image" on the projection surface are shifted relatively to each other.

The adjusting sub-frame image generator generates the "primary adjusting sub-frame image" and the "secondary adjusting sub-frame image" in the following manner. The relation of the width of the second line with respect to the width of the first line is set to N=M+1. Further, the first line and the second line are set so that the second line is displayed inside the first line when the "primary adjusting sub-frame image" and the "secondary adjusting sub-frame image" are projected onto the projection surface before adjustment of a shift amount.

The adjusting sub-frame image generator may generate the "primary adjusting sub-frame image" and the "secondary adjusting sub-frame image" in which the first color and the fourth color are both set to black and the second color and the third color are both set to white.

The adjusting sub-frame image generator may generate the "primary adjusting sub-frame image" and the "secondary adjusting sub-frame image" in which the first color and the fourth color are both set to black and the second color and the third color are both set to green.

The adjusting sub-frame image generator may generate the "primary adjusting sub-frame image" in which the first line is set to a design of combination of a line extending in the horizontal direction and a line extending in the vertical direction with respect to one side (e.g. a long side) of an image to be displayed on the projection surface.

The adjusting sub-frame image generator may generate the "secondary adjusting sub-frame image" in which the second line is set to a design of combination of a line extending in the horizontal direction and a line extending in the vertical direction with respect to the one side (e.g. a long side) of the image to be displayed on the projection surface.

The adjusting sub-frame image generator may generate the "secondary adjusting sub-frame image" in which the second line is set to a design of a line extending in either the horizontal direction or the vertical direction with respect to the one side (e.g. a long side) of the image to be displayed on the projection surface.

The adjusting sub-frame image generator may generate the "primary adjusting sub-frame image" and the "secondary adjusting sub-frame image" in which each of the first line and the second line is set to a design of a line extending in the diagonal direction with respect to one side (e.g. a long side) of an image to be projected onto the projection surface.

When two sub-frame images form one image frame in projector 100 as the projection type image display apparatus, the adjusting sub-frame image generator may generate one "primary adjusting sub-frame image" and one "secondary adjusting sub-frame image" in the one image frame.

When four sub-frame images form one image frame in projector 100 as the projection type image display apparatus, the adjusting sub-frame image generator may generate one "primary adjusting sub-frame image" and one or a plurality of "secondary adjusting sub-frame images" in the one image frame.

Thus, when adjusting the shift amount of each sub-frame image displayed on the screen, the user only needs to adjust the relative display positions of the "primary adjusting sub-frame image" and the "secondary adjusting sub-frame image" so that the second line displayed in the "secondary adjusting sub-frame image" is positioned in the center of the first line displayed in the "primary adjusting sub-frame image". That is, in this exemplary embodiment, the user can easily perform accurate adjustment operation of the pixel shift amount of the sub-frame images in projector 110 even visually.

The shift amount when the "primary adjusting sub-frame image" and the "secondary adjusting sub-frame image" are projected onto the projection surface is defined as S. The shift amount when an image (e.g. an image based on an input image signal) except the "primary adjusting sub-frame image" and the "secondary adjusting sub-frame image" is projected onto the projection surface is defined as So. Shift amount adjuster 413 may set the relation between shift amount S and shift amount So such that the relation satisfies the following equation:

$$So = S \times (\alpha\%2 + 1)/2$$

(where $\alpha\%2$ represents the remainder when a is divided by 2). This exemplary embodiment shows an example of $\alpha=1$, and shift amount So at this time is expressed by the following equation:

$$So = S \times (1+1)/2 = S,$$

which shows shift amount So is equal to shift amount S.

Second Exemplary Embodiment

Hereinafter, a description is provided for a method for adjusting a pixel shift amount in accordance with the second exemplary embodiment, with reference to FIG. 19. In the second exemplary embodiment, a projection type image display apparatus and an optical element driver are substantially identical in configuration and operation to projector 100 and optical element driver 4000 shown in the first exemplary embodiment, and the description of these elements is omitted.

The first exemplary embodiment shows an example where shift amount S when adjusting pattern images are projected onto the screen is equal to shift amount So when a general image is projected onto the screen. However, when $\alpha$ is an even number (e.g. $\alpha=0$ or $\alpha=2$), $$So = S \times (0+1)/2 = S/2,$$

which shows that shift amount So is one half of shift amount S.

The second exemplary embodiment shows an operation example of the projection type image display apparatus when a is an even number, and shift amount So in projection of a general image onto the screen is one half of shift amount S in projection of adjusting pattern images onto the screen. Thus, the adjusting pattern images in the second exemplary embodiment are different from those in the first exemplary embodiment.

[2-1. Method for Adjusting Pixel Shift Amount]

The operation in adjusting a pixel shift amount in the projection type image display apparatus of the second exemplary embodiment is substantially the same as the operation in adjusting a pixel shift amount in projector 100 of the first exemplary embodiment, and the description of the operation is omitted.

However, in the second exemplary embodiment, after the user has completed adjustment of the pixel shift amount, microcomputer 405 (optical element controller) sets the pixel shift amount to one half of that adjusted by the user. Then, each sub-frame image is displayed on the screen with a pixel shift amount one half of that adjusted by the user. Thus, in the second exemplary embodiment, the pixel shift amount is adjusted so that the shift amount is 1 pixel. That is, the projection type image display apparatus of the second exemplary embodiment generates adjusting pattern images set so that the pixel shift amount can be adjusted by 1 pixel. The above operations allow display of a double density image or a quad density image in which the shift amount of each sub-frame image is set to ½ pixel.

Figure 19:
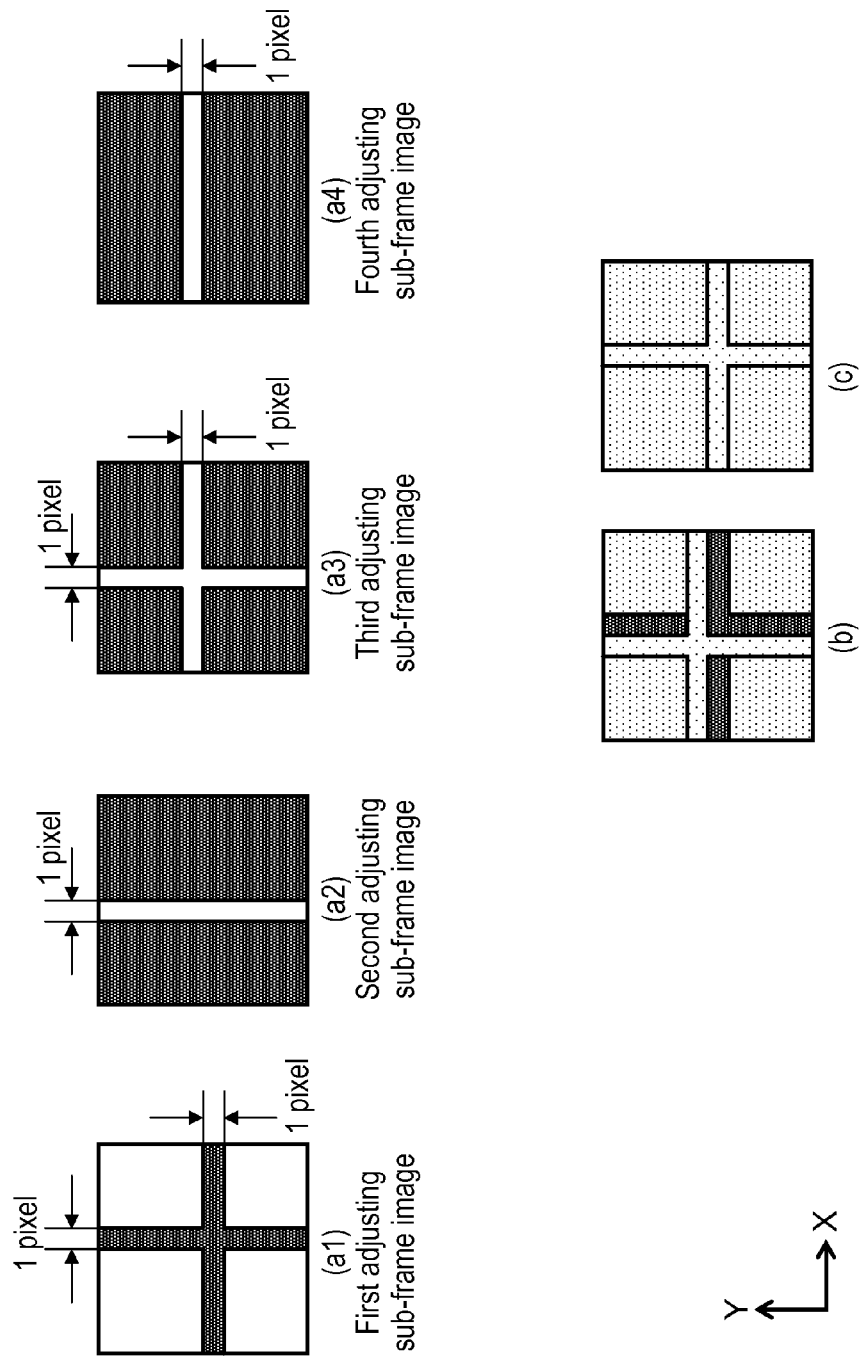
FIG. 19 is a chart schematically showing adjusting sub-frame images in accordance with a second exemplary embodiment.

A description is provided for adjusting pattern images for adjusting a pixel shift amount and appearance of the adjusting pattern images in adjustment of a pixel shift amount, with reference to FIG. 19. Herein, a description is provided for an example of adjusting the pixel shift amount of each of the first through fourth sub-frame images when a quad density image is projected onto the screen.

FIG. 19 is a chart schematically showing adjusting sub-frame images in accordance with the second exemplary embodiment. In FIG. 19, diagrams (a1) through (a4) show the first through fourth adjusting sub-frame images, respectively, displayed individually. Each of diagrams (b) and (c) shows the display image where the first through fourth adjusting sub-frame images overlap each other. Each of the images is enlarged.

In the example shown in FIG. 19, the first adjusting sub-frame image shown in diagram (a1) of FIG. 19 is an example of the "primary adjusting sub-frame image", and each of the second through fourth adjusting sub-frame images shown in diagrams (a2) through (a4), respectively, of FIG. 19 is an example of the "secondary adjusting sub-frame image".

Herein, the second adjusting sub-frame image shifts in the +X direction with respect to the first adjusting sub-frame image. The third adjusting sub-frame image shifts in the −Y direction with respect to the second adjusting sub-frame image. The fourth adjusting sub-frame image shifts in the −X direction with respect to the third adjusting sub-frame image. The first adjusting sub-frame image shifts in the +Y direction with respect to the fourth adjusting sub-frame image.

FIG. 19 shows an example where a first color and a fourth color are black, a second color and a third color are white, N=1, M=1, and $\alpha=0$ (i.e. N=M).

The first through fourth colors are not limited to the above colors and may be other colors.

As shown in diagram (a1) of FIG. 19, the first adjusting sub-frame image has a design in which a pattern of combination of a vertical line and a horizontal line each having the first color (black) and a width of an N pixel (1 pixel) is displayed on a solid background image having the second color (white).

The definitions the horizontal line and the vertical line in the second exemplary embodiment are the same as those of the first exemplary embodiment.

As shown in diagram (a2) of FIG. 19, the second adjusting sub-frame image has a design in which a vertical line having the third color (white) and a width of an M pixel (1 pixel) is displayed on a solid background image having the fourth color (black).

As shown in diagram (a3) of FIG. 19, the third adjusting sub-frame image has a design in which a pattern of combination of a vertical line and a horizontal line each having the third color (white) and a width of an M pixel (1 pixel) is displayed on a solid background image having the fourth color (black).

As shown in diagram (a4) of FIG. 19, the fourth adjusting sub-frame image has a design in which a horizontal line having the third color (white) and a width of an M pixel (1 pixel) is displayed on a solid background image having the fourth color (black).

The second adjusting sub-frame image is set to a design having a vertical line so as to allow adjustment of a shift amount of 1 pixel in the horizontal direction with respect to the first adjusting sub-frame image. The third adjusting sub-frame image is set to a design having combination of a horizontal line and a vertical line so as to allow a shift adjustment of 1 pixel in both horizontal and vertical directions with respect to the first adjusting sub-frame image. The fourth adjusting sub-frame image is set to a design having a horizontal line so as to allow a shift adjustment of 1 pixel in the vertical direction with respect to the first adjusting sub-frame image. However, this exemplary embodiment is not limited to this configuration. Preferably, the design of each sub-frame image is set based on the relative shift direction with respect to the "primary adjusting sub-frame image".

A description is provided for the display position of the line in each of the first, second, third, and fourth adjusting sub-frame images.

Diagram (b) of FIG. 19 is a diagram showing a state (initial state) where the first, second, third, and fourth adjusting sub-frame images are displayed so as to be overlapped each other without adjustment of a pixel shift amount.

In the example shown in FIG. 19, the line in each of the second through fourth adjusting sub-frame images is set to have a width of 1 pixel equal to that of the first line in the first adjusting sub-frame image. Further, the designs of the first through third adjusting sub-frame images are set as follows. As shown in diagram (b) of FIG. 19, in the initial state, the white vertical line having a width of 1 pixel in each of the second and third adjusting sub-frame images is displayed in the position outside and adjacent to the left contour of the black vertical line having a width of 1 pixel in the first adjusting sub-frame image.

The designs of the first, third, and fourth adjusting sub-frame images are set as follows. In the initial state, the white horizontal line having a width of 1 pixel in each of the third and fourth adjusting sub-frame images is displayed in the position outside and adjacent to the upper contour of the black horizontal line having a width of 1 pixel in the first adjusting sub-frame image.

Thus, in the initial state, on the screen, a black vertical line having a width of 1 pixel is displayed on the right side of a white vertical line having a width of 1 pixel and a black horizontal line having a width of 1 pixel is displayed on the lower side of a white horizontal line having a width of 1 pixel.

In this exemplary embodiment, the first, second, third, and fourth adjusting sub-frame images are set so that each adjusting sub-frame image satisfies the above conditions.

Each of diagrams (b) and (c) in FIG. 19 shows the state where four of the first through fourth adjusting sub-frame images are overlapped each other. Thus, the area where the white region in one of the adjusting sub-frame images overlaps the black region in another of the adjusting sub-frame images is shown by gray.

When the user operates shift amount operating part 412 so as to increase the pixel shift amount, the displacement amount instructed to actuators 401*a* through 401*d* from shift amount adjuster 413 via microcomputer 405 (optical element controller) increases. This increases the pixel shift amount. Thus, the vertical line in each of the second and third adjusting sub-frame images relatively shifts in the +X direction with respect to the vertical line in the first adjusting sub-frame image. The horizontal line in each of the third and fourth adjusting sub-frame images relatively shifts in the −Y direction with respect to the horizontal line in the first adjusting sub-frame image.

When the user operates shift amount operating part 412 so as to further increase the pixel shift amount, the displacement amount instructed to actuators 401*a* through 401*d* further increases. Then, the relative shift amount of each of the second and third adjusting sub-frame images with respect to the first adjusting sub-frame image becomes 1 pixel in the +X direction. The relative shift amount of each of the third and fourth adjusting sub-frame images with respect to the first adjusting sub-frame image becomes 1 pixel in the −Y direction. This state is shown in diagram (c) of FIG. 19.

At this time, the white vertical line in each of the second and third adjusting sub-frame images covers the black vertical line in the first adjusting sub-frame image, and the white horizontal line in each of the third and fourth adjusting sub-frame images covers the black horizontal line in the first adjusting sub-frame image. Thus, as shown in diagram (c) in FIG. 19, the black vertical line is hidden by the white vertical lines and invisible, and the black horizontal line is hidden by the white horizontal lines and invisible.

The state shown in diagram (c) of FIG. 19 is the state where the following adjustment (adjustment of the pixel shift amount) has been completed. That is, the display position of the second sub-frame image with respect to the first sub-frame image has been relatively shifted by 1 pixel in the horizontal (+X) direction. The display position of the third sub-frame image with respect to the first sub-frame image has been relatively shifted by 1 pixel in both horizontal (+X) and vertical (−Y) directions. The display position of the fourth sub-frame image with respect to the first sub-frame image has been relatively shifted by 1 pixel in the vertical (−Y) direction.

In the state where adjustment of the shift amount is completed, the white vertical lines cover the black vertical line and the white horizontal lines cover the black horizontal line. Thus, the user only needs to adjust the shift amount so that both black horizontal line and black vertical line are invisible. That is, the user only needs to continue adjustment of the shift amount until the adjusting pattern images displayed on the screen become the state shown in diagram (c) of FIG. 19, and to complete the adjustment of the shift amount when the adjusting pattern images become the state shown in diagram (c). Thus, in the projection type image display apparatus of this exemplary embodiment, the user can perform accurate adjustment of the pixel shift amount even visually.

In the example shown in FIG. 19, the projection type image display apparatus can be configured so that the third adjusting sub-frame image is a solid black image without white lines and the projection type image display apparatus adjusts the pixel shift amount only with the first, second, and fourth adjusting sub-frame images, for example. In this case, each of the second and fourth adjusting sub-frame images is an example of the "secondary adjusting sub-frame image".

Alternatively, the projection type image display apparatus can be configured so that each of the second and fourth adjusting sub-frame images is a solid black image without a white line and the projection type image display apparatus adjusts the pixel shift amount only with the first and third adjusting sub-frame images. In this case, the third adjusting sub-frame image is an example of the "secondary adjusting sub-frame image".

When a double density image is projected onto the screen, the pixel shift amount can be adjusted using the first adjusting sub-frame image shown in FIG. 19 as an example of the "primary adjusting sub-frame image" and the third adjusting sub-frame image shown in FIG. 19 as an example of the "secondary adjusting sub-frame image".

In the example shown in FIG. 19, the first through fourth adjusting sub-frame images do not necessarily overlap each other in the same position. For instance, the region where a line in the first adjusting sub-frame image overlaps the line in the second adjusting sub-frame image, the region where the lines in the first adjusting sub-frame image overlap the lines in the third adjusting sub-frame image, and the region where a line in the first adjusting sub-frame image overlaps the line in the fourth adjusting sub-frame image may be separated from each other. The first adjusting sub-frame image may have different designs in respective regions, depending on the designs of other adjusting sub-frame images overlapping the first adjusting sub-frame image. Specifically, in the first adjusting sub-frame image, the region overlapping the line in the second adjusting sub-frame image may have only the black vertical line having a width of 1 pixel, and the region overlapping the line in the fourth adjusting sub-frame image may have only the black horizontal line having a width of 1 pixel.

In the second exemplary embodiment, adjustment similar to the above can be performed, using patterns having colors and designs similar to those in the first through fourth variations shown in the first exemplary embodiment. Adjustment similar to the above can also be performed using patterns having diagonal lines similar to those in the fifth variation shown in the first exemplary embodiment.

[2-2. Variation of Second Exemplary Embodiment]

FIG. 19 shows an example where the first line and the second line are set to have an equal width of 1 pixel. In this exemplary embodiment, it may be set to $\alpha=2$, i.e. $N=M+2$ so that the first line has a width 2 pixel larger than the second line.

FIG. 20 is a chart showing a variation of the second exemplary embodiment. In FIG. 20, diagrams (a1) through (a4) show the first through fourth adjusting sub-frame images, respectively, displayed individually. Each of diagrams (b) and (c) shows the display image where the first through fourth adjusting sub-frame images overlap each other. Each of the images is enlarged.

The first through fourth adjusting sub-frame images shown in FIG. 20 are substantially identical to the first through fourth adjusting sub-frame images shown in FIG. 19. However, the first through fourth adjusting sub-frame images shown in FIG. 20 are different from those in FIG. 19 in that those shown in FIG. 20 are set to $N=3$ and $M=1$. That is, a first line displayed in the first adjusting sub-frame image is set to have a width of N pixels (3 pixels), and a second line displayed in each of the second, third, and fourth adjusting sub-frame images is set to have a width of an M pixel (1 pixel).

N and M are not limited to values of $N=3$ and $M=1$, and may be other numerical values that satisfy the relation of $N=M+\alpha$ (where when $\alpha=2$, $N=M+2$).

The designs of the first through fourth adjusting sub-frame images are set so that an image shown in diagram (b) of FIG. 20 is displayed on the screen when the first through fourth adjusting sub-frame images are displayed so as to be overlapped each other without adjustment of a pixel shift amount (an initial state).

That is, the white vertical line having a width of 1 pixel in each of the second and third adjusting sub-frame images is displayed in the position overlapping the 1-pixel wide left region of the black vertical line having a width of 3 pixels in the first adjusting sub-frame image. Further, the white horizontal line having a width of 1 pixel in each of the third and fourth adjusting sub-frame images is displayed in the position overlapping the 1-pixel wide upper region of the black horizontal line having a width of 3 pixels in the first adjusting sub-frame image.

Thus, in the initial state, on the screen, a black vertical line having a width of 2 pixels is displayed on the right side of a white vertical line having a width of 1 pixel and a black horizontal line having a width of 2 pixels is displayed on the lower side of a white horizontal line having a width of 1 pixel.

In the example shown in FIG. 20, when the adjusting pattern images displayed on the screen change from the state shown in diagram (b) to the state shown in diagram (c) in FIG. 20, the user adjustment of the shift amount is completed.

That is, the user only needs to adjust the shift amount so that the second lines displayed in the second, third, and fourth adjusting sub-frame images are positioned in the center of the first line displayed in the first adjusting sub-frame image.

After the user has completed the adjustment of the shift amount, as shown in diagram (c) of FIG. 20, a black vertical line having a width of 1 pixel appears on both right and left sides of a white vertical line, and a black horizontal line having a width of 1 pixel appears on both upper and lower sides of a white horizontal line having a width of 1 pixel. Thus, the user only needs to adjust the shift amount so as to increase the vertical and horizontal symmetry of the adjusting pattern images displayed on the screen, and can perform accurate adjustment of the pixel shift amount even visually.

[2-3. Advantageous Effects]

As described above, the projection type image display apparatus of the second exemplary embodiment is configured to generate a "primary adjusting sub-frame image" and a "secondary adjusting sub-frame image". The "primary adjusting sub-frame image" has a design in which a first line having a first color and a width of an N pixel (N being a natural number) is displayed on a background image having a second color. The "secondary adjusting sub-frame image" has a design in which a second line having a third color and a width of an M pixel, where the width is set to $N=M+\alpha$ (M being an integer equal to or greater than 1, and $\alpha=0$ or $\alpha=2$), is displayed on a background image having a fourth color.

The adjusting sub-frame image generator may generate the "primary adjusting sub-frame image" and the "secondary adjusting sub-frame image" in the following manner. The relation of the width of the second line with respect to the width of the first line is set to $N=M+2$. Further, the first line and the second line are set so that the second line is displayed inside the first line when the "primary adjusting sub-frame image" and the "secondary adjusting sub-frame image" are projected onto the projection surface before adjustment of a shift amount.

The adjusting sub-frame image generator may generate the "primary adjusting sub-frame image" and the "secondary adjusting sub-frame image" in the following manner. The width of the first line and the width of the second line are each set to 1 pixel. Further, the first line and the second line are set so that the second line is displayed in the position outside the first line and adjacent to the contour of the first line when the "primary adjusting sub-frame image" and the "secondary adjusting sub-frame image" are projected onto the screen before adjustment of a shift amount.

Thus, when adjusting the shift amount of each sub-frame image displayed on the screen, the user only needs to adjust the relative display positions of the "primary adjusting sub-frame image" and the "secondary adjusting sub-frame image" so that the second line displayed in the "secondary adjusting sub-frame images" is positioned in the center of the first line displayed in the "primary adjusting sub-frame image" or the first line is hidden by the second line. That is, also in this exemplary embodiment, the user can easily perform accurate adjustment operation of the pixel shift amount of the sub-frame images in the projection type image display apparatus even visually.

The shift amount when the "primary adjusting sub-frame image" and the "secondary adjusting sub-frame image" are projected onto the projection surface is defined as S. The shift amount when a general image (e.g. an image based on an input image signal) except the "primary adjusting sub-frame image" and the "secondary adjusting sub-frame image" is projected onto the projection surface is defined as So. In this case, as shown in the second exemplary embodiment, when α is an even number (e.g. α=0 or α=2), the relation between shift amount S and shift amount So is expressed by the following equation:

$$So = S \times (\alpha\%2+1)/2 = S \times (0+1)/2 = S/2$$

where α%2 represents the remainder when α is divided by 2. That is, the projection type image display apparatus of the second exemplary embodiment projects a general image onto the screen with shift amount So that is one half of shift amount S adjusted by projecting adjusting pattern images onto the screen.

Other Exemplary Embodiments

As described above, the first and second exemplary embodiments have been presented as examples of the technique of the present disclosure. However, the technique of the present disclosure is not limited to the above. Modifications, replacements, additions, omissions, or the like can be made on these exemplary embodiments and the present disclosure is intended to cover these variations. Further, respective elements described in the first and second exemplary embodiments may be combined to provide new exemplary embodiments.

Hereinafter, these other exemplary embodiments are described.

In the present disclosure, first through fourth colors are not limited to the above colors and may be other colors. For instance, the first color and the fourth color may be black, and the second color and the third color may be green. When these colors are applied to the example shown in FIG. 13, the first adjusting sub-frame image has a design in which combination of a black horizontal line and a black vertical line each having a width of 2 pixels is displayed on a solid green background image. The second adjusting sub-frame image has a design in which a green vertical line having a width of 1 pixel is displayed on a solid black background image. The third adjusting sub-frame image has a design in which combination of a green vertical line and a green horizontal line each having a width of 1 pixel is displayed on a solid black background image. The fourth adjusting sub-frame image has a design in which a green horizontal line having a width of 1 pixel is displayed on a solid black background image.

For instance, insufficient alignment of DMDs 240, 250, and 260 can cause displacement of the display positions of red pixels, green pixels, and blue pixels on the screen. This produces color shift in the adjusting pattern images displayed on the screen and makes it difficult to adjust the shift amount. However, when adjusting pattern images are only formed of black and green, for example, adjusting pattern images only formed of green are displayed on the screen even when DMDs 240, 250, and 260 are insufficiently aligned. This causes no color shift and thus enhances visibility. Such adjusting pattern images make adjustment of the shift amount easier than those formed of a plurality of colors. Further, green, whose light amount is larger, is brighter and more visible than red and blue. Thus, green has higher visibility than the other two colors. Therefore, an adjusting pattern image formed of only green can make adjustment of the shift amount easier than an adjusting pattern image formed of only red or only blue.

The color combination in which the first color and the fourth color are black and the second color and the third color are green is also applicable to adjusting sub-frame images shown in FIG. 14 through FIG. 20.

Shift amount operating part 412 and shift amount adjuster 413 shown in FIG. 2 may be combined into one.

In the configuration described in each of the first and second exemplary embodiments, the user adjusts the shift amount. However, in place of the user, an adjuster having a computer-controlled shift amount adjusting function may adjust the shift amount.

The number of first lines or the number of second lines is not limited to one in one adjusting sub-frame image, and a plurality of first lines or a plurality of second lines may be used in one adjusting sub-frame image.

The background image in each adjusting sub-frame image is not limited to a solid image, and may have any design that does not hinder adjustment of the shift amount. For instance, as shown in FIG. 17, only the 1-pixel region on both sides of the first line may be set to a background image having a second color, and the other regions may be set to black.

The present disclosure is applicable to a projection type image display apparatus that displays an image by projecting a plurality of sub-frame images onto a projection surface. Specifically, the present disclosure is applicable to a projector, for example.

What is claimed is:

1. A projection type image display apparatus configured to display an image formed of an image frame on a projection surface by projecting a plurality of sub-frame images forming the image frame onto the projection surface, the projection type image display apparatus configured to be capable of optically shifting projection positions of the sub-frame images when the sub-frame images are projected onto the projection surface, the projection type image display apparatus comprising:
  an adjusting sub-frame image generator configured to generate
    a primary adjusting sub-frame image having a design in which a first line having a first color and a width of an N pixel (N being a natural number) is displayed on a background image having a second color; and
    a secondary adjusting sub-frame image having a design in which a second line having a third color and a width of an M pixel where the width is set to N=M+α (M being an integer equal to or greater than 1, α being an integer equal to or greater than 0) is displayed on a background image having a fourth color; and
  a shift amount adjuster configured to adjust a shift amount when a display position of the primary adjusting sub-frame image on the projection surface and a display position of the secondary adjusting sub-frame image on the projection surface are shifted relatively to each other.

2. The projection type image display apparatus according to claim 1, wherein the adjusting sub-frame image generator generates the primary adjusting sub-frame image and the secondary adjusting sub-frame image in such a manner that a relation of the width of the second line with respect to the width of the first line is set to N=M+1 or N=M+2, and the first line and the second line are set so that the second line is displayed inside the first line when the primary adjusting sub-frame image and the secondary adjusting sub-frame image are projected onto the projection surface before adjustment of the shift amount.

3. The projection type image display apparatus according to claim 1, wherein the adjusting sub-frame image generator generates the primary adjusting sub-frame image and the secondary adjusting sub-frame image in such a manner that the width of the first line and the width of the second line are each set to 1 pixel, and the first line and the second line are set so that the second line is displayed in a position outside the first line and adjacent to a contour of the first line when the primary adjusting sub-frame image and the secondary adjusting sub-frame image are projected onto the projection surface before adjustment of the shift amount.

4. The projection type image display apparatus according to claim 1, wherein the adjusting sub-frame image generator generates the primary adjusting sub-frame image and the secondary adjusting sub-frame image in which the first color and the fourth color are both set to black and the second color and the third color are both set to white.

5. The projection type image display apparatus according to claim 1, wherein the adjusting sub-frame image generator generates the primary adjusting sub-frame image and the secondary adjusting sub-frame image in which the first color and the fourth color are both set to black and the second color and the third color are both set to green.

6. The projection type image display apparatus according to claim 1, wherein the adjusting sub-frame image generator generates the primary adjusting sub-frame image in which the first line is set to a design of combination of a line extending in a horizontal direction and a line extending in a vertical direction with respect to one side of an image to be displayed on the projection surface.

7. The projection type image display apparatus according to claim 6, wherein the adjusting sub-frame image generator generates the secondary adjusting sub-frame image in which the second line is set to a design of combination of a line extending in the horizontal direction and a line extending in the vertical direction with respect to the one side.

8. The projection type image display apparatus according to claim 6, wherein the adjusting sub-frame image generator generates the secondary adjusting sub-frame image in which the second line is set to a design of a line extending in either the horizontal direction or the vertical direction with respect to the one side.

9. The projection type image display apparatus according to claim 1, wherein the adjusting sub-frame image generator generates the primary adjusting sub-frame image and the secondary adjusting sub-frame image in which each of the first line and the second line is set to a design of a line extending in a diagonal direction with respect to one side of an image to be projected onto the projection surface.

10. The projection type image display apparatus according to claim 1, wherein, when two sub-frame images form one image frame in the projection type image display apparatus, the adjusting sub-frame image generator generates the one primary adjusting sub-frame image and the one secondary adjusting sub-frame image in the one image frame.

11. The projection type image display apparatus according to claim 1, wherein, when four sub-frame images form one image frame in the projection type image display apparatus, the adjusting sub-frame image generator generates the one primary adjusting sub-frame image, and the one secondary adjusting sub-frame image or a plurality of the secondary adjusting sub-frame images in the one image frame.

12. The projection type image display apparatus according to claim 1, wherein, in a case where the shift amount, when the primary adjusting sub-frame image and the secondary adjusting sub-frame image are projected onto the projection surface, is defined as S, and a shift amount, when an image except the primary adjusting sub-frame image and the secondary adjusting sub-frame image is projected onto the projection surface, is defined as So, the shift amount adjuster sets a relation between the shift amount S and the shift amount So to $$So = S \times (\alpha\%2 + 1)/2$$

where $\alpha\%2$ represents a remainder when a is divided by 2.

13. An adjusting method for adjusting a shift amount of a projection type image display apparatus, the projection type image display apparatus configured to display an image formed of an image frame on a projection surface by projecting a plurality of sub-frame images forming the image frame onto the projection surface, the projection type image display apparatus configured to be capable of optically shifting projection positions of the sub-frame images when the sub-frame images are projected onto the projection surface, the adjusting method comprising:

generating a primary adjusting sub-frame image that has a design in which a first line having a first color and a width of an N pixel (N being a natural number) is displayed on a background image having a second color;

generating a secondary adjusting sub-frame image that has a design in which a second line having a third color and a width of an M pixel where the width is set to N=M+α (M being an integer equal to or greater than 1, α being an integer equal to or greater than 0) is displayed on a background image having a fourth color; and shifting a display position of the primary adjusting sub-frame image on the projection surface and a display position of the secondary adjusting sub-frame image on the projection surface relative to each other.

* * * * *